(12) United States Patent
Feller

(10) Patent No.: US 9,678,216 B2
(45) Date of Patent: Jun. 13, 2017

(54) SHORT RANGE POSITION SENSING DEVICE AND METHOD OF USE

(71) Applicant: Hemisphere GNSS Inc., Scottsdale, AZ (US)

(72) Inventor: Walter J. Feller, Scottsdale, AZ (US)

(73) Assignee: Hempishere GNSS, Inc., Scottsdale, AZ (US)

( * ) Notice: Subject to any disclaimer, the term of this patent is extended or adjusted under 35 U.S.C. 154(b) by 605 days.

(21) Appl. No.: 14/249,095

(22) Filed: Apr. 9, 2014

(65) Prior Publication Data

US 2016/0170031 A1  Jun. 16, 2016

Related U.S. Application Data

(60) Provisional application No. 61/892,269, filed on Oct. 17, 2013.

(51) Int. Cl.

| G01S 19/51 | (2010.01) |
| G01S 19/42 | (2010.01) |
| G01S 19/53 | (2010.01) |
| G01S 19/14 | (2010.01) |
| G01S 1/02 | (2010.01) |

(52) U.S. Cl.
CPC .............. *G01S 19/51* (2013.01); *G01S 1/02* (2013.01); *G01S 19/14* (2013.01); *G01S 19/53* (2013.01)

(58) Field of Classification Search
CPC ............................. G01S 19/51; G01S 13/878
USPC ............ 342/357.2, 357.25, 357.34, 357.36, 342/357.71; 701/468, 470
See application file for complete search history.

(56) References Cited

U.S. PATENT DOCUMENTS

2009/0121932 A1* 5/2009 Whitehead ........... A01B 69/008
342/357.36
2010/0312428 A1* 12/2010 Roberge ............... A01B 69/007
701/23

* cited by examiner

*Primary Examiner* — Dao Phan
(74) *Attorney, Agent, or Firm* — Schmeiser, Olsen & Watts LLP

(57) ABSTRACT

A device for determining the position and orientation of a first body with respect to a second body uses a plurality of radio frequency (RF) transmitters on the first body to transmit a short range signal to one or more RF antennas on the second body. The first and second body are near each other and can be moveably coupled. A receiver circuit on the second body uses the plurality of RF signals received by the RF antennas to determine the position and orientation of the first body with respect to the second body. In some embodiments one or more GNSS antennas mounted to the second body will provide the GNSS coordinate system and location such that the position and orientation of both the first body and the second body can be referenced to the GNSS global coordinate system.

22 Claims, 15 Drawing Sheets

SHORT RANGE POSITION SENSING DEVICE AND METHOD OF USE

CROSS REFERENCE TO RELATED APPLICATIONS

This application claims priority to U.S. Provisional Patent Application to Walter Feller entitled "Short Range Position Sensing Device," Ser. No. 61/892,269 filed Oct. 17, 2013, the disclosure of which is hereby incorporated entirely herein by reference.

BACKGROUND OF THE INVENTION

Technical Field

This invention relates to electronic devices which determine the position and/or attitude of a body, such as Global Navigation Satellite System (GNSS) attitude sensing devices, and more specifically to a short range position sensing device.

State of the Art

Global Navigation Satellite System (GNSS) devices are commonly used to determine the position and attitude of vehicles, people, animals, or other bodies. It is sometimes desirable to know the position and orientation of a first body with respect to a second body, where the first body and the second body are a relatively short distance away from each other. For example, it might be desirable to know the orientation of a bulldozer blade (first body) with respect to the bulldozer cab (second body). One way to determine the position and orientation of a first body with respect to a second nearby body is to put either a GNSS antenna or a GNSS antenna and GNSS receiver on the first body. For example, a GNSS antenna could be mounted to the bulldozer blade, and coaxial cables could run from the blade to a GNSS receiver mounted in the cab of the bulldozer. However, these RF coaxial cables have to be carefully protected from rocks, dirt, oil, etc. The cables require spring coils to remain flexible but not permit them to drop on the ground with large angle changes of the blade relative to the cab. The range of motion may be as much as 20 feet. Thus is it not desirable to run coaxial cables between the first body and the second body in many cases.

An alternative is to put both the GNSS antenna and the GNSS receiver on the bulldozer blade. But the shock and vibration of first bodies such as a bulldozer blade can be intense, and it is often not possible for the GNSS receiver to retain carrier phase lock through this shock and vibration. Thus in many situations it is not desirable to have both a GNSS antenna and the GNSS receiver on the remote first body.

Accordingly, what is needed is a device for determining the position and orientation of a first body with respect to a second body, without requiring that a GNSS antenna or a GNSS receiver be mounted to the first body.

DETAILED DESCRIPTION OF EMBODIMENTS OF THE INVENTION

Figure 1:
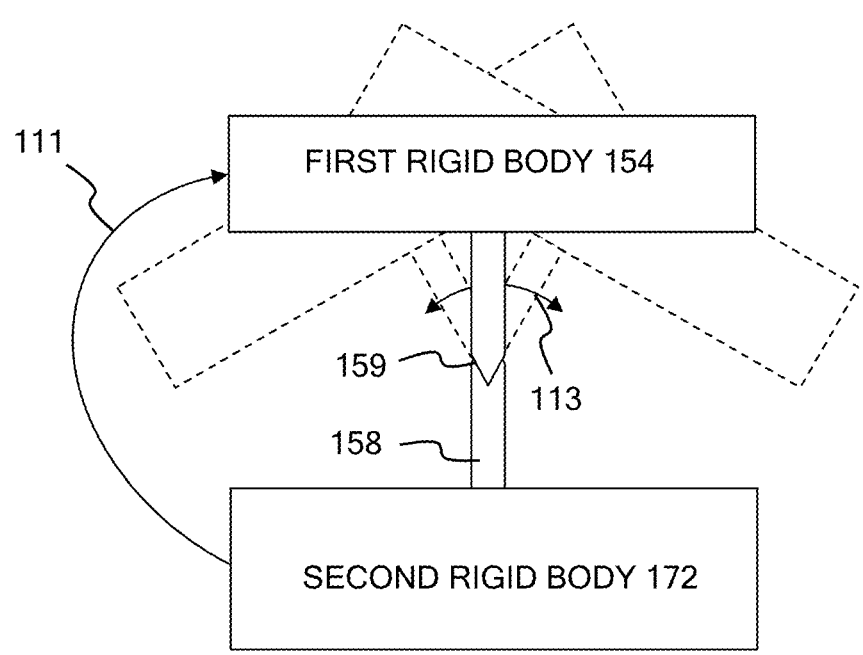
FIG. 1 shows a block diagram of first rigid body 154 moveably coupled to second rigid body 172.

As discussed above, embodiments of the present invention relate to electronic devices which determine the position and/or attitude of a body, such as GNSS attitude sensing devices, and more specifically to a short range position sensing device.

Global Navigation Satellite System (GNSS) devices are commonly used to determine the position and attitude (orientation) of vehicles, people, animals, or other bodies. It is sometimes desirable to know the position and orientation of a first body with respect to a second body, where the first body and the second body are a relatively short distance away from each other. For example, it might be desirable to know the orientation of a semi-truck trailer (first body) with respect to the semi-truck cab (second body). It may be desirable to know the position of a towed implement (first body) with respect to the towing tractor (second body). The driver can determine if a towed device such as the tractor trailer is becoming unstable, for example, or a tractor driver can determine exactly where to put seed or fertilizer, by knowing this position and/or orientation information. In these examples the first body is connected to the second body, but that does not have to be the case.

One way to determine the position and orientation of a first body with respect to a second nearby body is to put either a GNSS antenna or a GNSS antenna and GNSS receiver on the first body. For example, a GNSS antenna could be mounted to a bulldozer blade—the first body, and coaxial cables could run from the blade to a GNSS receiver mounted in the cab of the bulldozer—the cab is the main second body. However, these RF coaxial cables have to be carefully protected from rocks, dirt, oil, etc. The cables require spring coils to remain flexible but not permit them to drop on the ground with large angle changes of the blade relative to the cab. The range of motion may be as much as 20 feet, and this is difficult to accommodate with coaxial cables. Additionally, when a GNSS antenna is mounted to an implement near the ground such as a bulldozer blade, reflections of GNSS satellite signals off of the ground can significantly impair the location and position determination. Thus is it not desirable to run coaxial cables between the first body and the second body in many cases.

An alternative is to put both the GNSS antenna and the GNSS receiver on the blade—the first body. But the shock and vibration of first bodies such as a dozer blade is intense and it is often not possible for the GNSS receiver to retain carrier phase lock through this shock and vibration. This is due to the clock being exposed to jumps which in turn cause phase discontinuities in the measurement. Thus in many situations it is not desirable to have both a GNSS antenna and the GNSS receiver on a remote first body.

In some situations a first body cannot receive GNSS satellite signals. For example, an earth drill—the first body—that is controlled by a drill rig. The earth drill may be underground or otherwise obscured from receiving GNSS signals. In this case a GNSS antenna and receiver mounted to the earth drill would not be able to compute position and orientation of the earth drill because it cannot receive GNSS satellite signals.

Accordingly, what is needed is a device for determining the position and orientation of a first body with respect to a second body, without requiring that a GNSS antenna or a GNSS receiver be mounted to the first body. Disclosed is a device for determining the position and/or orientation of a first body with respect to a second body. In some embodiments the first body controls the second body. The disclosed device uses a plurality of radio frequency transmitters on the first body to transmit a short range signal to one or more RF receive antennas on the second body. A receiver circuit on the second body uses the plurality of RF signals received by the RF antennas to determine the position and orientation of the first body with respect to the second body. In some embodiments one or more GNSS antennas mounted to the second body will provide the GNSS coordinate system and location such that the position and orientation of both the first body and the second body can be referenced to the GNSS global coordinate system. When using the disclosed device, there is no requirement that a GNSS antenna or a GNSS receiver unit be mounted to the first body.

The RF transmitters and receive antennas have several advantages, including low power consumption and the ability to transmit through smoky, dusty, or foggy air. Lasers are sometimes used for distance and range measurements, but impaired atmospheric conditions such as smoke, dust, or fog can greatly inhibit the transmission of laser light through the atmosphere. The RF signals transmitted from the RF transmitters to the RF receive antennas do not have these difficulties. Another advantage of using the RF transmitters and receive antennas is that the transmitted RF signal can be encoded with system information other than what is used for range and position. For example, information about the status and condition of the first body (tire pressure, fuel tank level, engine warnings or condition, etc.) can be transmitted to the second body via the RF signals.

Figure 2:
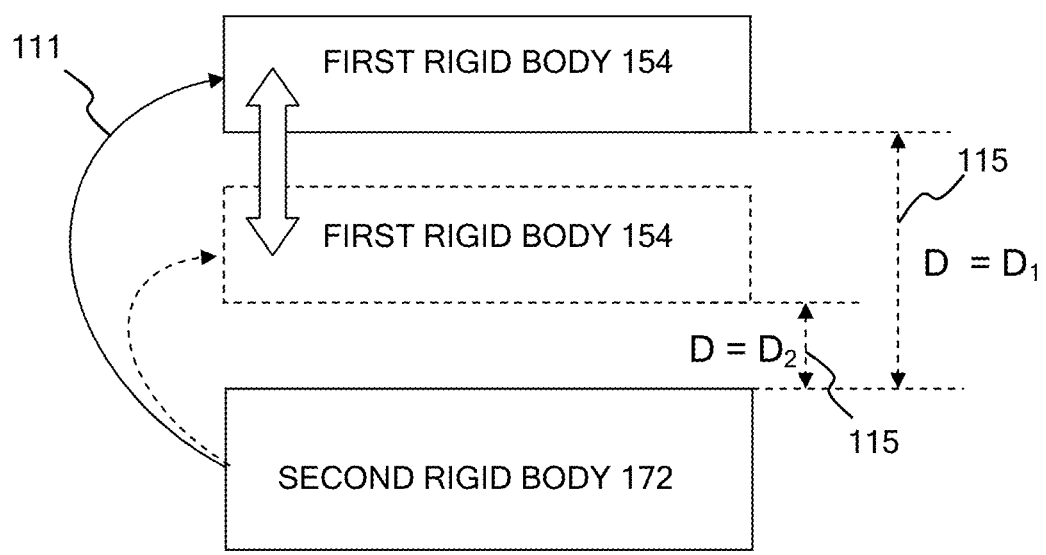
FIG. 2 shows a block diagram of first rigid body 154 controlled by second rigid body 172.

FIG. 1 shows a simple block diagram example of first rigid body 154 and second rigid body 172. First body 172 and second body 154 are both rigid bodies in this example, but this is not meant to be limiting. Second rigid body 172 controls first rigid body 154 through control 111. Control 111 can be wired or wireless control 111, optical control 111, electronic control 111, mechanical control 111, pneumatic control 111, hydraulic control 111, or any other method of controlling one body with another. In this embodiment second rigid body 172 is moveably coupled to first rigid body 154, but this is not meant to be limiting. FIG. 2 for example, shows an example of first rigid body 154 and second rigid body 172, where second rigid body 172 controls first rigid body 154 through control 111. In the example shown in FIG. 2, first rigid body 154 and second rigid body 172 are not mechanically coupled to each other.

Position and orientation as used in this document can include many things. In some embodiments position means location, as in a computed GNSS location. In some embodiments computing the position of a first body with respect to a second body means computing the GNSS location of the first body and the second body. In some embodiments computing the position of a first body with respect to a second body means computing the offset of the first body with respect to the GNSS location of the second body. Offset is used here as it is used in the GNSS location industry, where it means the physical offset from a GNSS location. Offset can be given by direction and distance, for example, or any other method of indicating the physical offset from a physical location as is known in the art now or in the future.

Position can be distance D as shown in FIG. 2, where first rigid body 154 moves such that distance D is variable. FIG. 2 shows first rigid body 154 a distance D $115=D_1$ from second rigid body 172. Distance D is variable, and FIG. 2 also shows in dotted lines where first rigid boy 154 is distance D $115=D_2$ from second rigid body 172. In this example determining the position of first rigid body 154 with respect to second rigid body 172 means determining the distance D of first rigid body 154 from second rigid body 172. In this example second rigid body 172 controls the distance D of first rigid body 154 from second rigid body 172 using control 111.

In some embodiments position means angle, such that determining the position of first rigid body 154 with respect to second rigid body 172 means determining the angle 113 (see FIG. 1) of first rigid body 154 with respect to second rigid body 172. In FIG. 1 first rigid body 154 is moveably coupled to second rigid body 172 with mechanical coupling 158. In this embodiment mechanical coupling 158 includes mechanical joint 159 which allows first rigid body 154 to rotate through a range of angles 113 with respect to second rigid body 172. In this example second rigid body 172 controls the rotation of first rigid body 154 through the range of angles 113 using control 111.

Orientation as used in this document includes the possible elements of position such as distance or angle, but orientation often means there are more degrees of freedom and so more variables to solve for. In some embodiments orientation means attitude. Orientation and attitude refer to determining the spatial orientation of one coordinate system to another coordinate system. In some embodiments determining the orientation of first rigid body 154 with respect to second rigid body 172 means determining the spatial orientation of the coordinate system of first rigid body 154 with respect to the spatial orientation of the coordinate system of second rigid body 172. A rigid body free to move in space has in general six degrees of freedom, so in some embodiments spatial orientation is measured by six variables. In some embodiments, spatial orientation is measured by the six variables X, Y, Z, roll, pitch and yaw. In general, determining the orientation of first rigid body 154 with respect to second rigid body 172 means solving for the variables of the spatial orientation system that define the attitude of first rigid body 154 with respect to second rigid body 172. Any orientation or attitude defining system, variable, or coordinate system can be used as is known in the art now or in the future. GNSS systems have defined parameters and variables for determining attitude, which can apply here.

Figure 3:
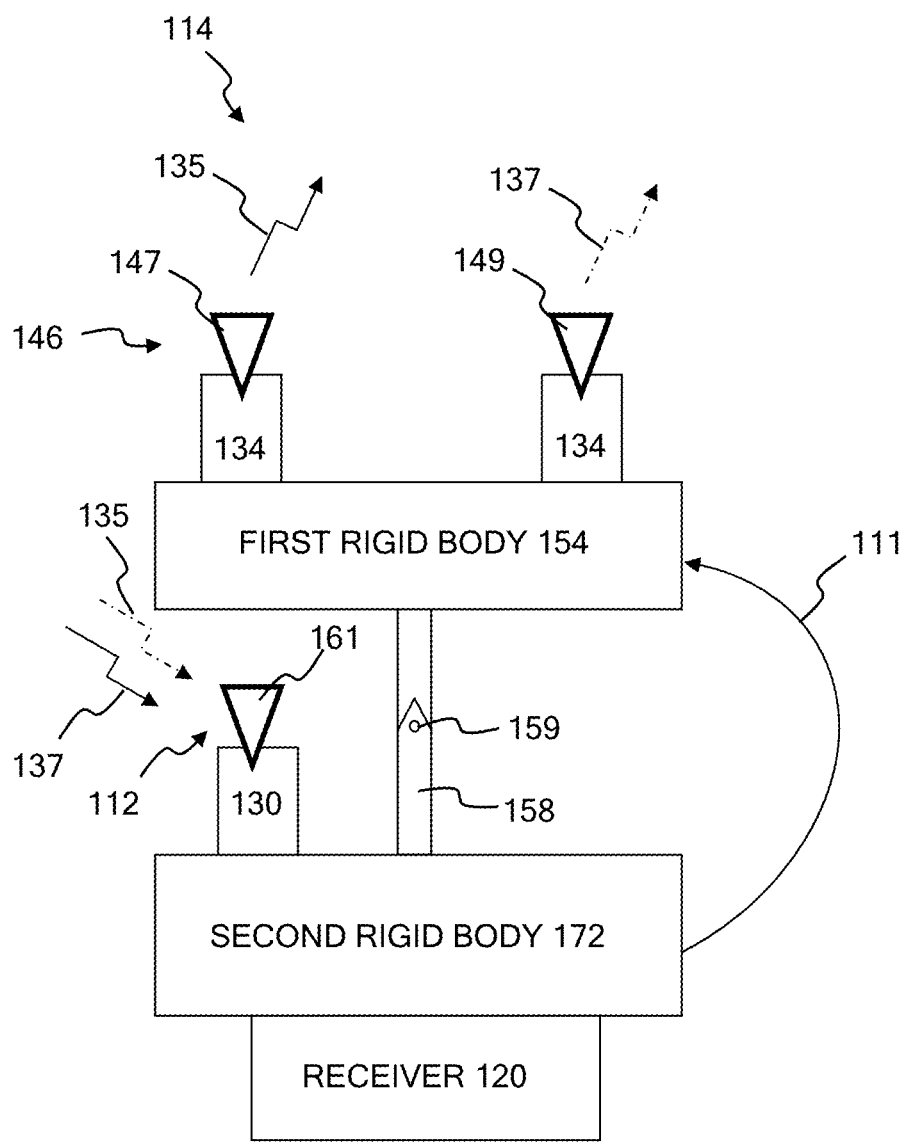
FIG. 3 shows a simplified block diagram of an embodiment of device 110.
Figure 4:
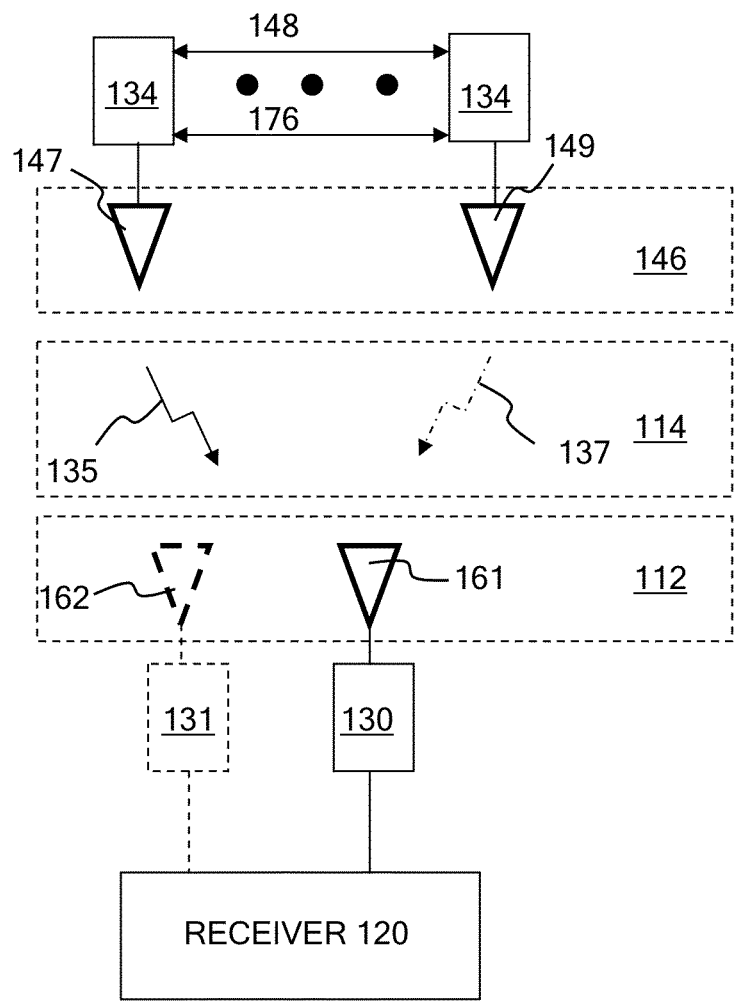
FIG. 4 shows a simplified schematic diagram of device 110 of FIG. 3.
Figure 6:
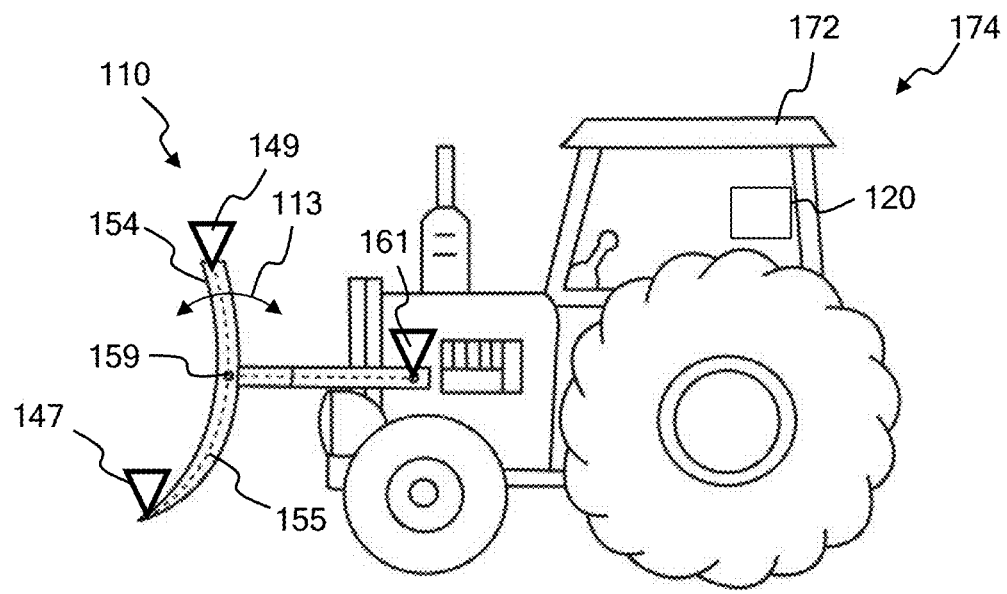
FIG. 6 shows an illustration of device 110 mounted to tractor 174.
Figure 7:
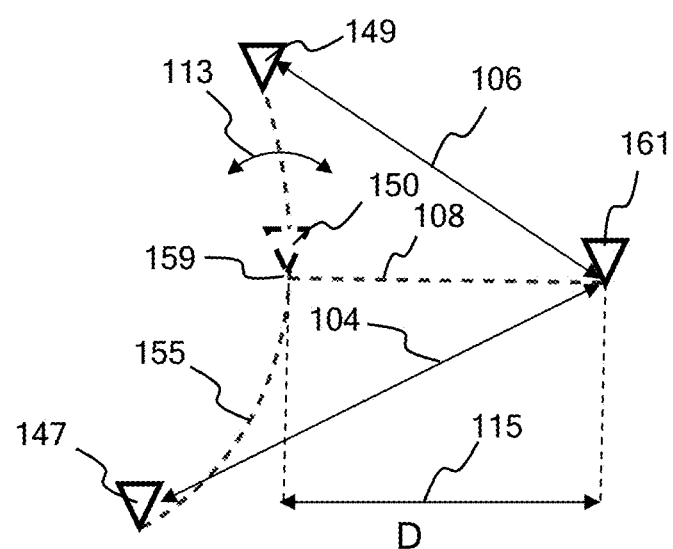
FIG. 7 shows a spatial diagram of an embodiment of RF transmitters and RF receiving antenna of device 110 of FIG. 3 mounted to tractor 174 of FIG. 6.

FIG. 3 through FIG. 67 show an embodiment of device 110 for determining the position and/or orientation of first body 154 with respect to second body 172. FIG. 3 shows a simplified block diagram of an embodiment of device 110. FIG. 4 shows a simplified schematic of device 110 of FIG. 3. FIG. 6 shows a side view of tractor 174 using device 110 of FIG. 3, where first body 154 is the tractor blade, and second body 172 is the tractor cab/body. FIG. 7 shows a side view of the RF transmitters and RF receiver antennas (to be discussed shortly) of device 110 and their spatial orientation with respect to one another on tractor 174. Device 110 determines the position and orientation of first rigid body 154 with respect to second rigid body 172. In some embodiments device 110 is a GNSS system. In some embodiments device 110 is a GNSS device.

Device 110 for determining the position and orientation of first rigid body 154 with respect to second rigid body 172 includes a plurality of radio frequency (RF) transmitters 146 as shown in FIG. 3 and FIG. 4. Each one of plurality of radio frequency transmitters 146 is coupled to first rigid body 154. Plurality of radio frequency transmitters 146 includes a first RF transmitter 147 and a second RF transmitter 149 in the embodiment shown in FIG. 3, FIG. 5, and FIG. 6. In some embodiments plurality of RF transmitters 146 includes more than two RF transmitters (see FIG. 7, for example). Each one of the plurality of RF transmitters 146, including first RF transmitter 147 and second RF transmitter 149, transmits an RF signal.

Figure 5:
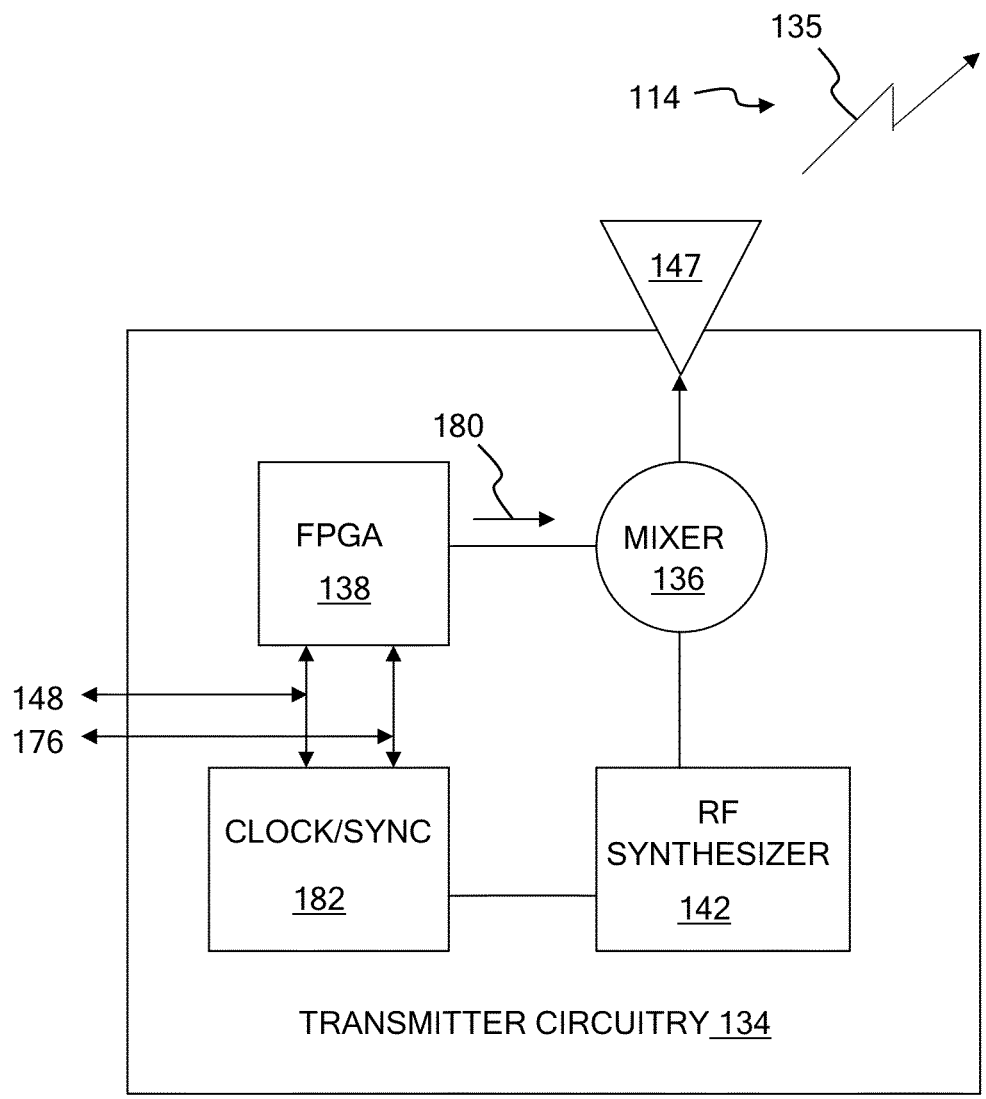
FIG. 5 shows a simplified schematic diagram of an embodiment of transmitter circuitry 134 of device 110.

Plurality of RF transmitters 146 transmits a plurality of RF signals 114, as shown in FIG. 4. Plurality of RF signals 114 in the embodiment shown in FIG. 3 through FIG. 6 includes first RF signal 135 and second RF signal 137. Each one of plurality of RF signals 114 is a spread spectrum code signal containing a shared transmitter clock 176 signal and a position message 180 (see FIG. 5) which identifies the position of the one of plurality of RF transmitters 146 on first rigid body 154 which originated the one of RF signals 114. Each one of plurality of RF transmitters 146 is electrically coupled to and driven by a transmitter circuitry such as transmitter circuitry 134 as shown in FIG. 3, FIG. 4, and FIG. 5.

Each transmitter circuit 134 in this embodiment generates a spread spectrum code RF signal for transmission by the one of plurality of RF transmitters 147 connected to the transmitter circuitry 134. Each of plurality of RF transmitters 146 transmits a different spread spectrum code, so that each RF receiving antenna can identify which particular RF transmitter originated the RF signal. In some embodiments orthogonal spread spectrum codes are used so that more than one of plurality of RF transmitters 146 can use the same frequency, yet each RF receiving antenna can still track the source of each RF signal. The spread spectrum code signal can utilize chirp, pseudo-random, or frequency hopping frequency techniques. In some embodiments plurality of RF signals 114 includes other than a spread spectrum code to transmit information. Transmitter circuitry 134 in the embodiment shown in FIG. 5 includes field-programmable gate array (FPGA) 138, clock/sync circuit 182, RF synthesizer 142, mixer 136, and RF transmitter 147.

Clock/sync circuit 182 generates and shares a sync signal 148 and a transmitter clock signal 176 among each of the transmitter circuitries 134 coupled to plurality of RF transmitters 146. Plurality of RF transmitters 146 share the same transmitter clock signal 176 and time offset, which can be accomplished using network timing protocols. Each one of plurality of RF transmitters 146 is time-synchronized to transmitter clock signal 176. Plurality of RF transmitters 146 share sync signal 148 also.

FPGA 138 has an embedded processor which generates the spread spectrum code and timing sync. FPGA 138 generates position messages 180 that are included in RF signal 135 in this example. Position messages 180 identify which specific one of plurality of RF transmitters 147 is transmitting each particular RF signal. This allows receiver 120 to identify where each one of plurality of RF signal 114 originated from on first body 154.

RF synthesizer 142 creates the RF carrier signal for each of plurality of RF signals 114. In this embodiment RF synthesizer creates a 2.45 gigahertz (GHz) carrier signal. Mixer 136 combines the RF carrier signal from RF synthesizer 142 with the message 180 and code from FPGA 138 into one of plurality of RF signals 114, which in this embodiment is RF signal 135, and sends it to RF transmitter 147 for transmission. Each of plurality of RF signals 114 has a frequency in an RF frequency range. In this embodiment each of plurality of RF signals 114 has a frequency of 2.45 GHz but this is no meant to be limiting. In some embodiments each of plurality of RF signals 114 has a frequency of 5.7 GHz. In some embodiments each of plurality of RF signals 114 has a frequency within the range of 300 megahertz (MHz) to 10 GHz.

Each one of plurality of RF transmitters 146 and their corresponding transmitter circuitry 134 is electrically connected to each of the other ones of plurality of RF transmitters 146 and their corresponding transmitter circuitry 134. In this way plurality of RF transmitters 146 share sync 148 and transmitter clock 176 signals. Plurality of RF transmitters 146 can be connected by cable or wirelessly to each other. By using plurality of transmitters 146, all using the same transmitter clock 176 signal on first body 154, any jumps in transmitter clock 176 can be removed using an extra measurement provided by an extra one of plurality of transmitters 146. Having four RF transmitters and two RF receiving antenna provides eight measurements when there are six independent variables to solve for. This provides the ability to correct transmitter clock 176 offset, since it is common to all of plurality of RF transmitters 146, and still have one extra measurement for quality monitoring/assurance.

Each one of plurality of RF transmitters 146 is a short range transmitter which consumes little power. Plurality of RF transmitters 146 can be battery powered, solar powered or otherwise provided with their operating power.

Device 110 for determining the position and orientation of first rigid body 154 with respect to second rigid body 172 includes at least one radio frequency (RF) receiving antenna 112, which in this embodiment is an RF receiving antenna 161 as shown in FIG. 4. Each of the at least one RF receiving antennas 112 are coupled to second rigid body 172 (FIG. 4). In this embodiment at least one receiving antenna 112 includes one RF receiving antenna 161, but this is not meant to be limiting. In some embodiments at least one RF receiving antenna 112 is plurality of RF receiving antennas 112 and includes second RF receiving antenna 162 as shown in dotted lines in FIG. 4. In some embodiments plurality of RF receiving antennas 112 includes more than two RF receiving antennas. Each one of at least one RF receiving antennas 112 receives plurality of RF signals 114. It is to be understood that each one of RF receiving antennas 112 receives each one of plurality of RF signals 114. Each of at least one RF receiving antennas 112 receives each one of plurality of RF signals 114 simultaneously, and can identify which of plurality of RF transmitters 146 originated each RF signal by the unique spread spectrum code associated with each one of plurality of RF transmitters 146.

RF receiving antenna 161 is coupled to receiving antenna circuit 130. Receiving antenna circuit 130 receives plurality of RF signals 114 as received by RF receiving antenna 161, and sends plurality of RF signals 114 as received by RF receiving antenna 161 to receiver 120. In some embodiments receiving antenna circuit 130 conditions plurality of RF signals 114. In some embodiments receiving antenna circuit 130 changes the frequency of RF signals 114, as discussed later in this document with regard to receiver circuitry 230. Optional second RF receiving antenna 162, if used, would be coupled to receiver circuitry 131, which in this embodiment is a duplicate of receiving antenna circuit 130, but is coupled second RF receiving antenna 162. In some embodiments plurality of RF receiving antennas 112 includes more than two RF receiving antennas.

In the embodiment shown in FIG. 3 through FIG. 7, second rigid body 172 is moveably coupled to first rigid body 154, but this is not meant to be limiting. In some embodiments second rigid body 172 is not coupled to first rigid body 154. First rigid body 154 is controlled by second rigid body 172 using control 111 in this embodiment.

Device 110 for determining the position and orientation of first rigid body 154 with respect to second rigid body 172 includes receiver 120. Receiver 120 calculates the position and/or orientation of first rigid body 154 with respect to second rigid body 172 in response to receiving plurality of RF signals 114 as received by each of RF receiving antennas 112. In this embodiment receiver circuit 120 calculates the position and/or orientation of first rigid body 154 with respect to second rigid body 172 in response to receiving plurality of RF signals 114 as received by RF receiving antenna 161. Receiver circuit 120 can calculate the position and/or orientation of first rigid body 154 with respect to second rigid body 172 in many different ways.

In the embodiment shown in FIG. 3 through FIG. 7, receiver circuit 120 calculates the position and/or orientation of first rigid body 154 with respect to second rigid body 172 by calculating the range 104 (FIG. 7) between first RF transmitter 147 and RF receiving antenna 161, and the range 106 between second RF transmitter 149 and RF receiving antenna 161. In this embodiment tractor 174 has a known geometry and known set of physical relationships between first rigid body 154—the tractor blade, and second rigid body 172—the tractor body. First rigid body 154 is controlled by an operator of tractor 174 using control 111, which in this embodiment is hydraulic control 111. In this embodiment first rigid body 154 can move a distance D 115 from second rigid body 172 and first rigid body 154 can rotate through a range of angles 113 with respect to second rigid body 172. Computation of ranges 106 and 108 are used in conjunction with the known geometry of first rigid body 154 and second rigid body 172 to compute the position and orientation of first rigid body 154 with respect to second rigid body 172, where in this embodiment position and orientation is represented by distance D 115 and angle 113.

Receiver 120 computes range 104 and range 106 using plurality of RF signals 114, in this embodiment RF signals 135 and 137, as received by RF receiving antenna 161. Receiver 120 can compute range 104 and range 106 using RF signals 135 and 137 received by RF receiving antenna 161 in many different ways. In this embodiment each RF signal 135 and 137 shares common transmitter clock signal 176. RF signals 135 provide the time of transmission. Receiver 120 computes the time it takes for RF signal 135 and 137 to travel from their respective RF transmitters 147 and 149 to RF antenna 161, and uses this time to compute ranges 104 and 106. In addition, each RF signal 135 and 137 includes position message 180 which identifies the specific RF transmitter 147 or 149 that originated the RF signal 135 or 137. RF transmitters 147 and 149 are mounted at known positions on first rigid body 154, such as at either end of reference line 155 as shown in the figures. The range, position and known geometry of tractor 174 can be used to solve for position and orientation variables. In some embodiments ranges 104 and 106 are differenced, and the differences used to solve for additional variables of the position and/or orientation of first rigid body 154 with respect to second rigid body 172.

The distance D 115 between first rigid body 152 and second rigid body 172 is hydraulically controlled in this embodiment, which changes the distance 115 between mechanical joint 159 and RF receiving antenna 161 as shown in FIG. 7. In some embodiments a third RF transmit antenna 150 is placed at mechanical joint 159 as shown in dotted lines in FIG. 7. In this example with third antenna 150, the range 108 between third RF transmit antenna 150 and RF receive antenna 161 is the distance D 115 between first rigid body 154 and second rigid body 172. In general using the known geometry of first rigid body 154, which in this case would mean knowing the geometry of reference line 155 of the tractor blade, computing the range 104 and range 106, and optionally distance D 115, will provide enough information to compute the position and orientation of first rigid body 154 with respect to second rigid body 172. The number and location of plurality of RF transmitters 146 on first rigid body 154, and the number and location of plurality or RF receiving antennas 112 are chosen to be sufficient in number and optimized in placement to solve for orientation variables, X, Y, Z, roll, pitch, and yaw, and to solve for transmitter clock 176 offset. In some embodiments plurality of RF transmitters 146 includes four RF transmitters, and plurality of RF receiving antennas 112 includes two RF receiving antennas. This provides enough signals to solve for the six degrees of freedom of orientation of first rigid body 154, and to solve for transmitter clock 176 offset. In some embodiments plurality of RF receiving antennas 112 includes three RF antennas, where a third RF antenna has a height offset as compared to first RF antenna 161. This known height offset can be used to calculate position and orientation of first rigid body 154 with respect to second rigid body 172.

Figure 8:
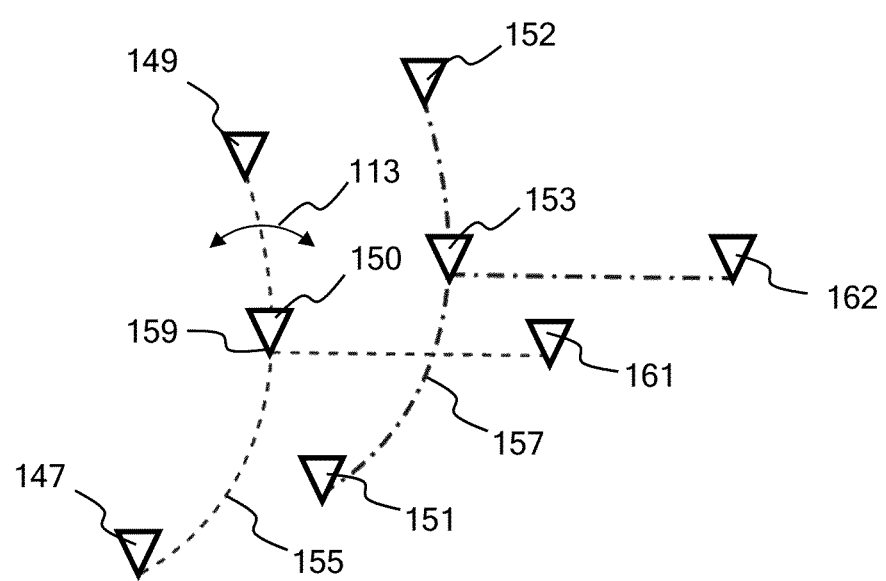
FIG. 8 shows a spatial diagram of a further embodiment of RF transmitters and RF receiving antenna of device 110 mounted to tractor 174 of FIG. 6.

FIG. 8 shows a perspective view of one embodiment of the placement of six RF transmitters 147, 149, 150, 151, 152, and 153 on first rigid body 154, which in this embodiment is tractor blade 154 of tractor 174 of FIG. 6. And FIG. 8 also shows an example placement of two RF receiving antennas 161 and 162 on second rigid body 172, which in this embodiment is tractor body 172 of tractor 174 of FIG. 6. Tractor 174 is not shown in FIG. 8 for simplicity, but shown in reference line 155, which is on the left side of tractor blade 154 as shown in FIG. 6, and reference line 157, which is on the right side of blade 154. As mentioned earlier, this combination of six RF transmitters 146 and two RF receiving antenna 112 at optimized placement with respect to the geometry of first rigid body 154 and second rigid body 172 provide the ability to solve for orientation of first rigid body 154 including six orientation variables X, Y, Z, roll, pitch, and yaw, to solve for location with respect to first rigid body 172; and to solve for transmitter clock 176 offset.

Figure 9:
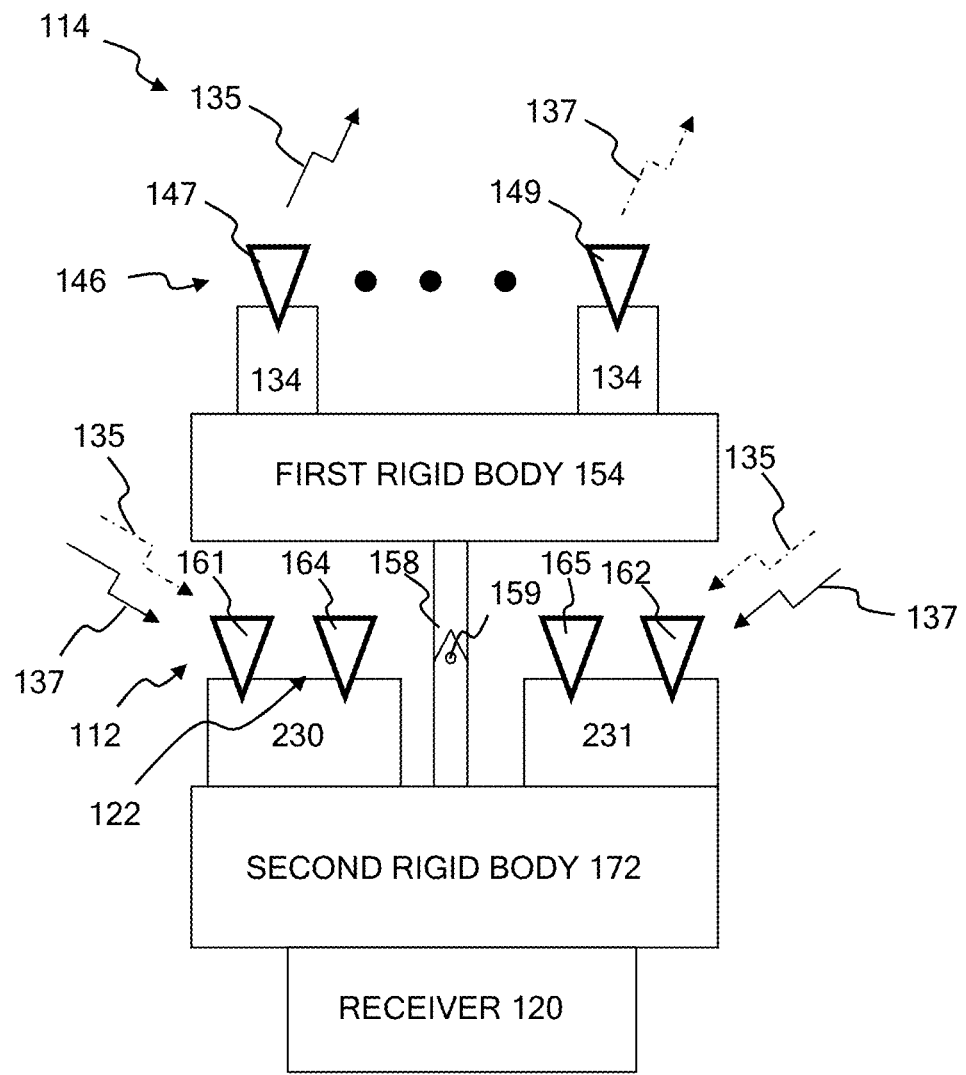
FIG. 9 shows a simplified block diagram of an embodiment of device 210.
Figure 10:
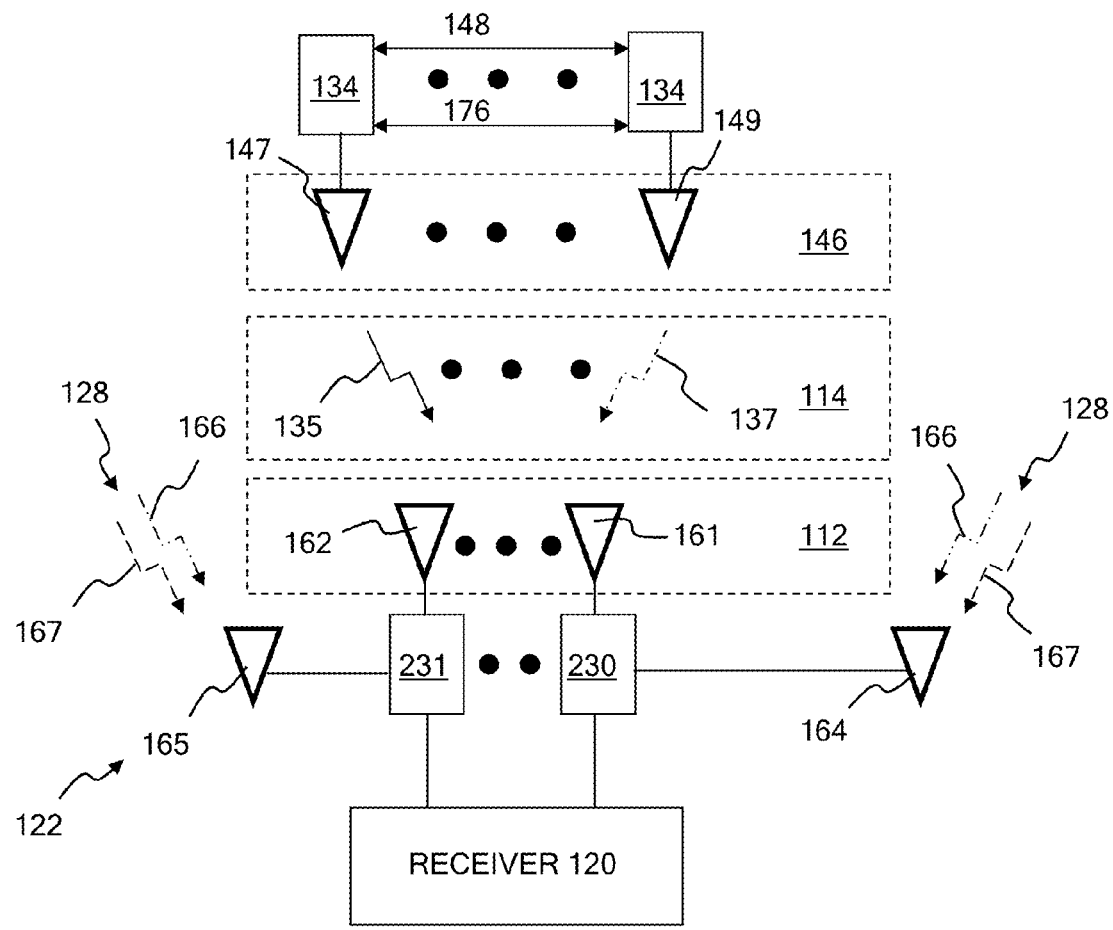
FIG. 10 shows a simplified schematic diagram of device 210.
Figure 11:
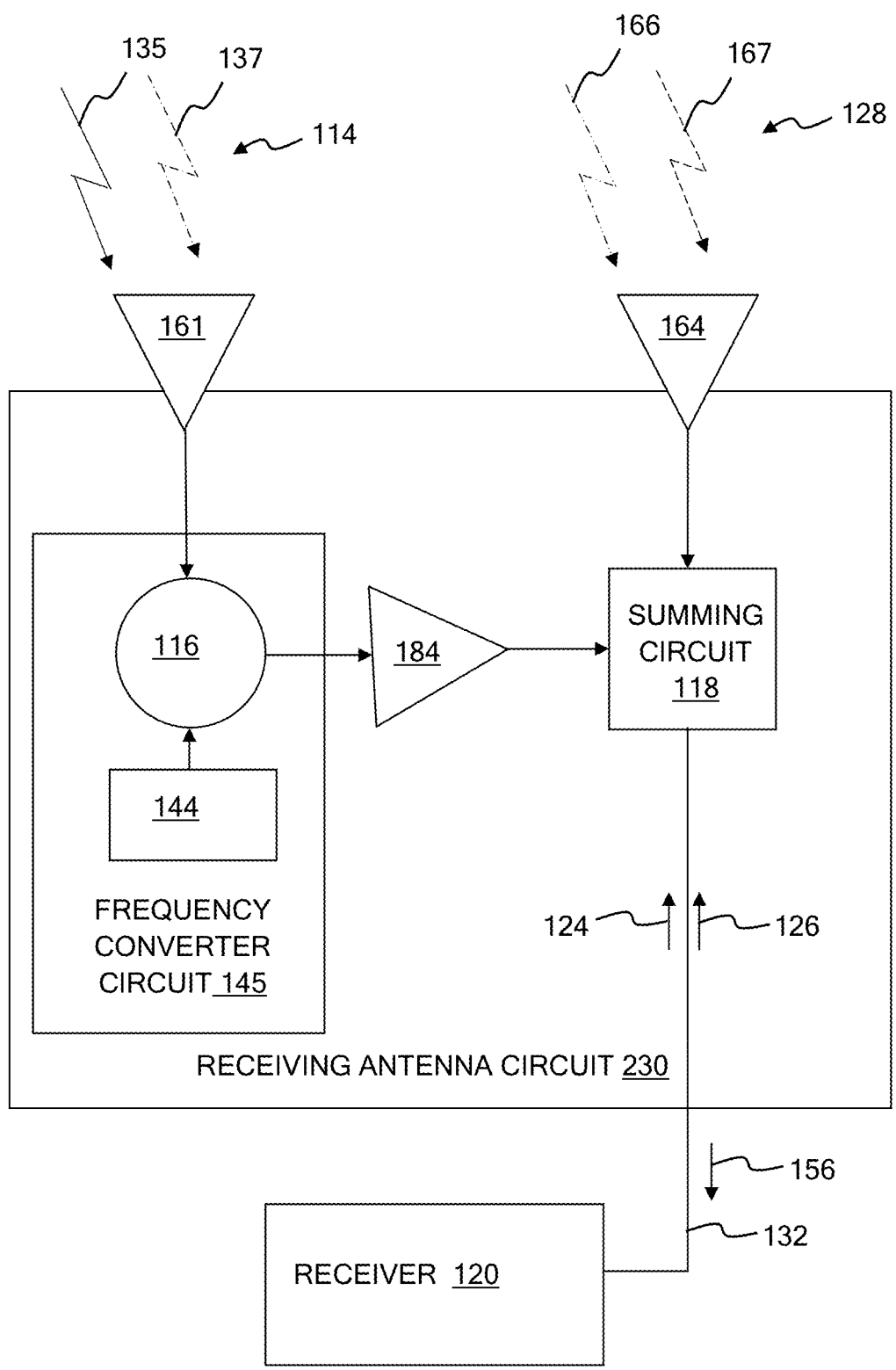
FIG. 11 shows a simplified schematic diagram of an embodiment of receiving antenna circuitry 230 of device 210.
Figure 12:
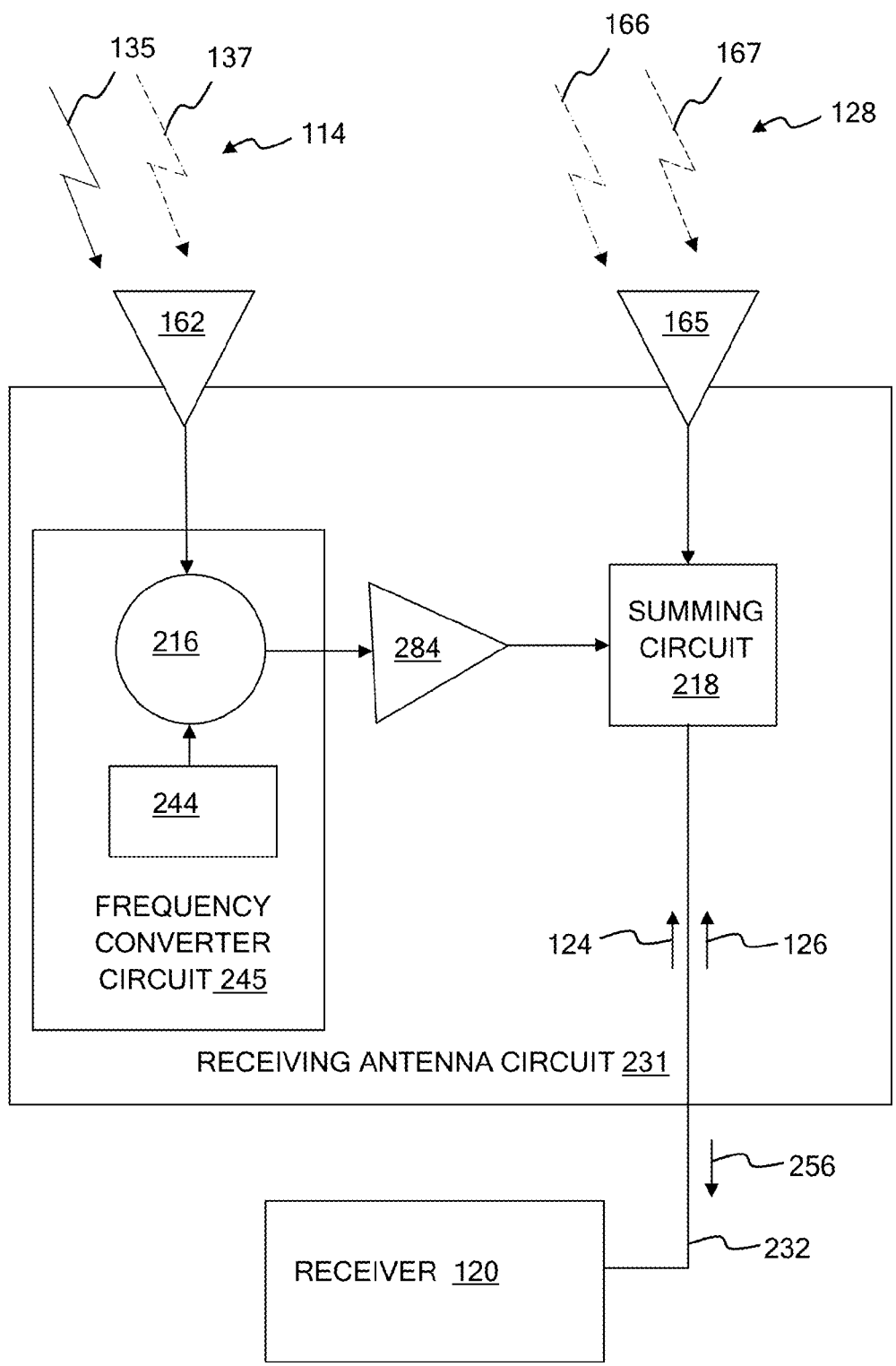
FIG. 12 shows a simplified schematic diagram of an embodiment of receiving antenna circuitry 231 of device 210.
Figure 13:
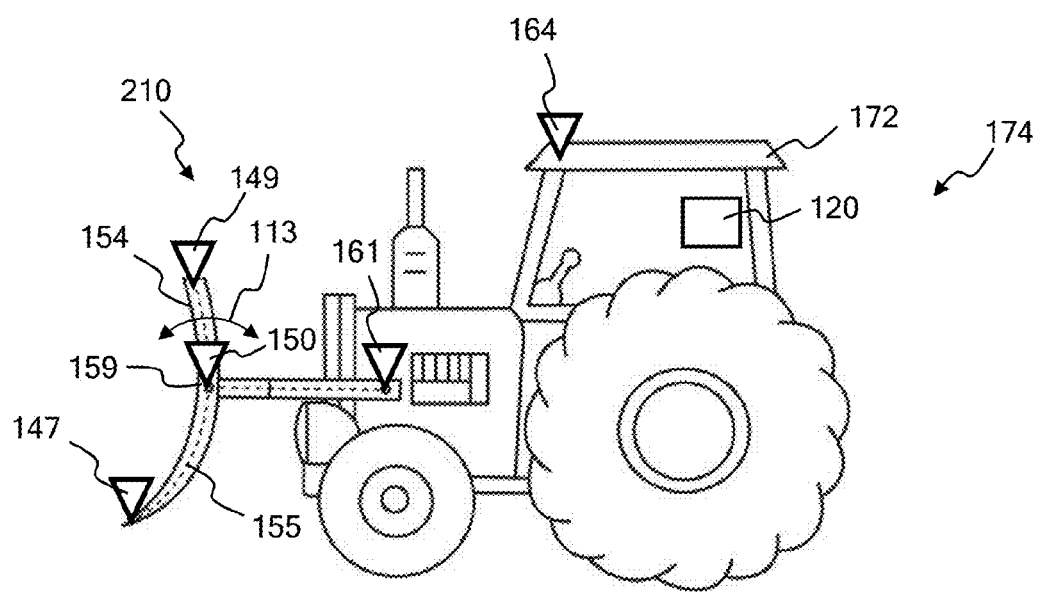
FIG. 13 shows an illustration of device 210 mounted to tractor 174.
Figure 14:
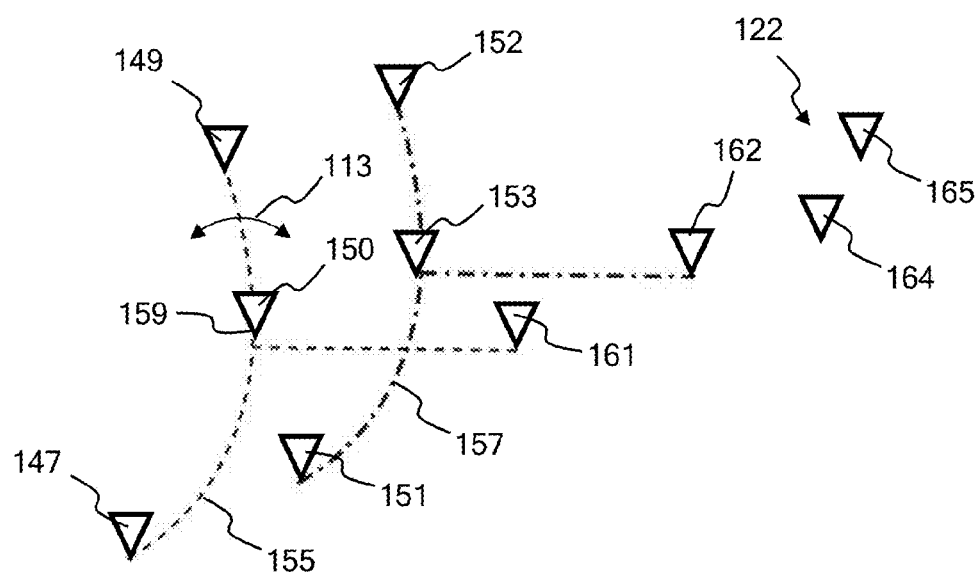
FIG. 14 shows a spatial diagram of an embodiment of RF transmitters, RF receiving antennas, and GNSS antennas of device 210 mounted to tractor 174 of FIG. 13.
Figure 15:
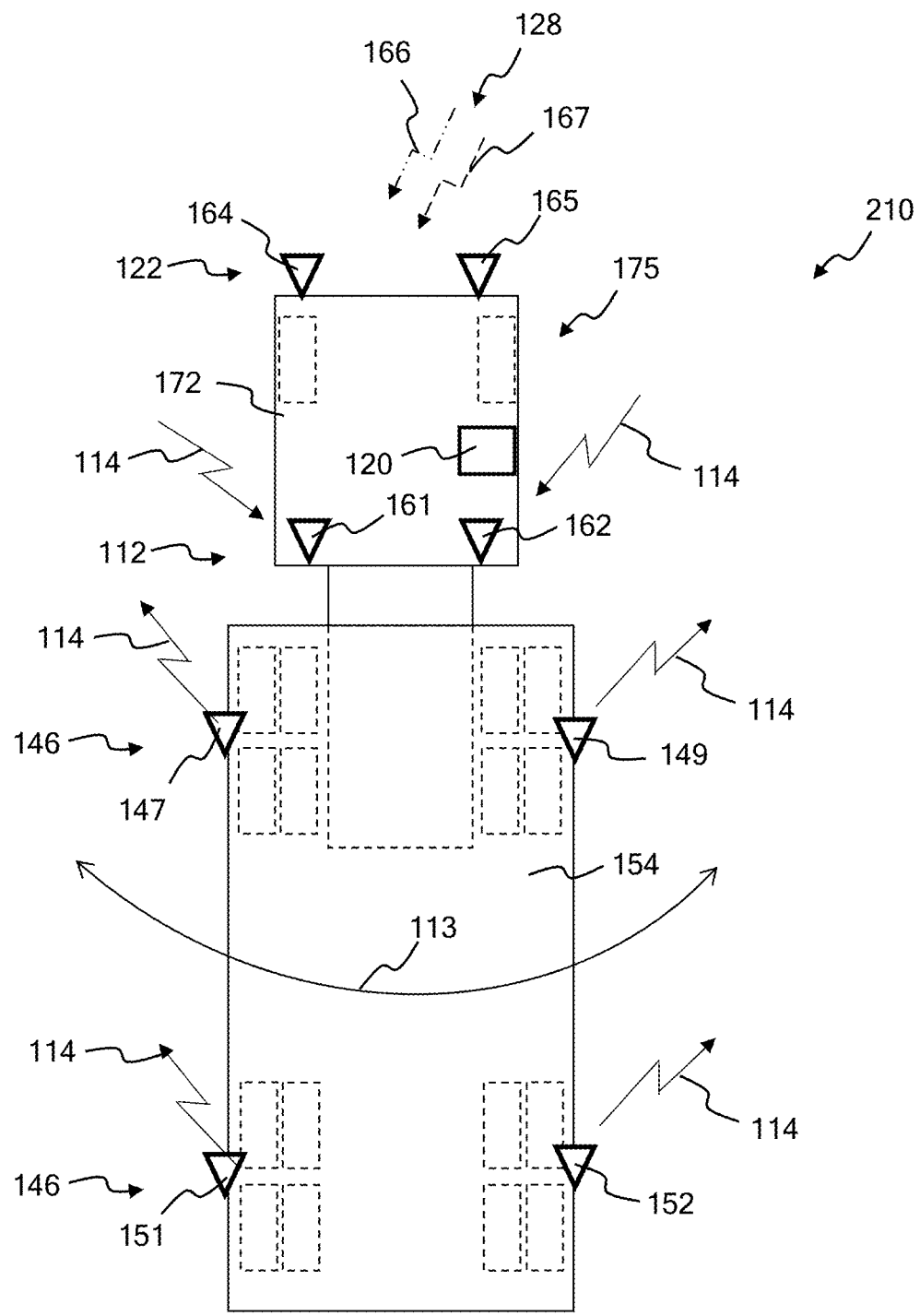
FIG. 15 shows a simplified illustration of device 210 mounted to semi-truck 175.
Figure 16:
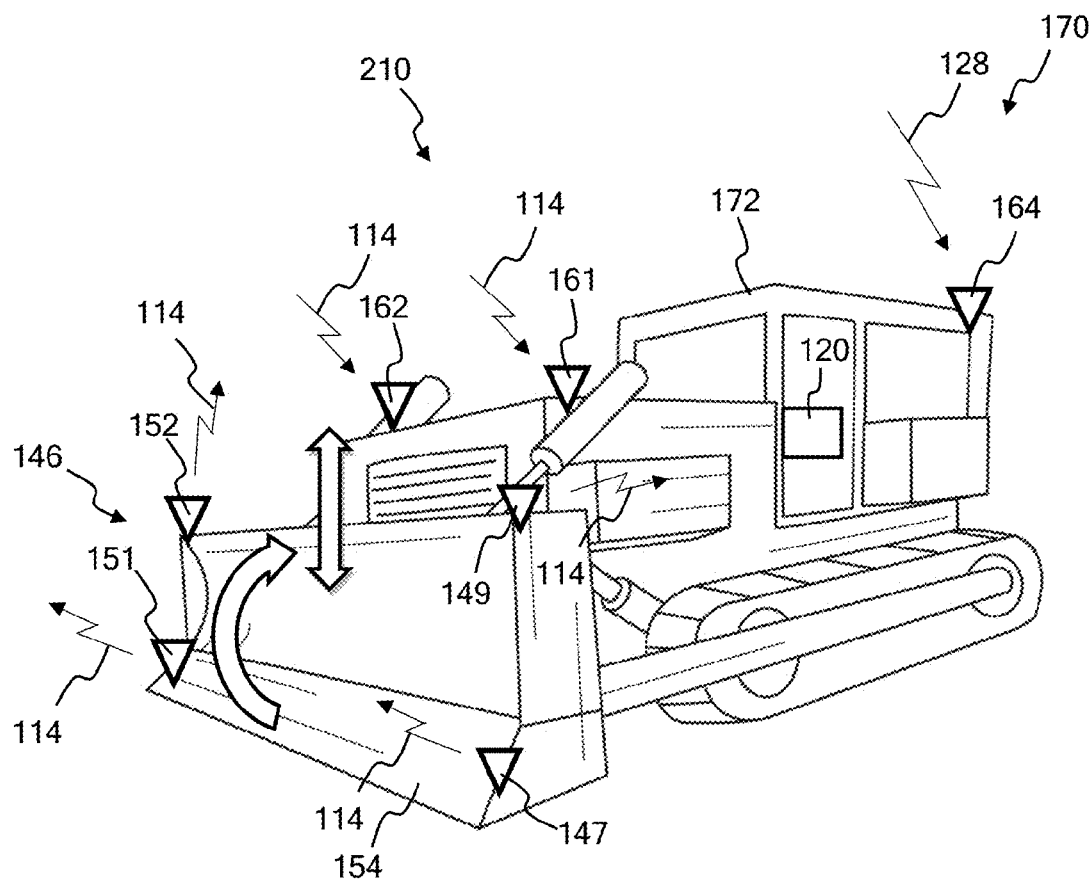
FIG. 16 shows a simplified illustration of device 210 mounted to bulldozer 170.

FIG. 9 through FIG. 16 show details of an embodiment of a GNSS device 210 for determining the position and orientation of first rigid body 154 with respect to second rigid body 172. FIG. 9 shows a simplified block diagram of GNSS device 210. FIG. 10 shows a simplified schematic of GNSS device 210 of FIG. 9. FIG. 11 shows an example embodiment of first receiving antenna circuit 230 of GNSS device 210 of FIG. 9. FIG. 12 shows an example embodiment of second receiving antenna circuit 231 of GNSS device 210 of FIG. 9. FIG. 13 shows an example use of GNSS device 210, where GNSS device 210 is mounted to tractor 174. FIG. 14 shows a perspective view of the spatial relationship of plurality of RF transmitters 146, plurality of RF receiving antennas 112, and plurality of GNSS antennas 128 as they are mounted on tractor 174. FIG. 15 shows another example usage of GNSS device 210, where GNSS device 210 is mounted to semi-truck 175. FIG. 16 shows another example usage of GNSS device 210, where GNSS device 210 is mounted to bulldozer 170.

GNSS device 210 for determining the position and orientation of first rigid body 154 with respect to second rigid body 172 includes similar elements as device 110, except GNSS device 210 includes plurality of GNSS antennas 128, which in this embodiment includes first GNSS antenna 164 and second GNSS antenna 165. First and second GNSS antennas 164 and 165 receive plurality of GNSS signals 128 from a plurality of GNSS satellites (not shown), and provide the capability to reference the position and orientation of first rigid body 154 and second rigid body 172 to a GNSS coordinate system.

GNSS device 210 for determining the position and orientation of first rigid body 154 with respect to second rigid body 172 includes plurality of radio frequency (RF) transmitters 146 as shown in FIG. 10. Plurality of RF transmitters 146 transmits plurality of RF signals 114, as shown in FIG. 10 and discussed earlier with regard to device 110. Each one of plurality of radio frequency transmitters 146 is coupled to first rigid body 154 as shown in FIG. 9. Plurality of radio frequency transmitters 146 includes first RF transmitter 147 and second RF transmitter 149, as explained earlier with respect to device 110. In some embodiments plurality of RF transmitters 146 includes more than two RF transmitters, as indicated by the dotted lines between first RF transmitter 147 and second RF transmitter 149 in FIG. 9 and FIG. 10. Each one of plurality of RF transmitters 146, including first RF transmitter 147 and second RF transmitter 149, transmits a short range RF signal in a first frequency range, as discussed earlier with respect to device 110. First RF transmitter 147 and second RF transmitter 149 are each driven by a corresponding RF transmitter circuitry 134, as explained earlier with respect to device 110 and RF transmitter circuitry of FIG. 5.

In this embodiment first RF transmitter 147 transmits first RF signal 135 in a first frequency range, and second RF transmitter 149 transmits second RF signal 137 in the first frequency range. First and second RF transmitters 147 and 149, and their corresponding transmitter circuitries 134, share sync signal 148 and transmitter clock signal 176 as discussed with regard to device 110. Each one of plurality of RF signals 114 is a spread spectrum code signal containing a shared transmitter clock 176 signal and a position message 180 (see FIG. 5) which identifies the position of the one of plurality of RF transmitters 146 on first rigid body 154 which originated the one of RF signals 114. This allows receiver 120 to know the position of each one of the plurality of RF transmitting antennas 146 and to compute the range to each one of the plurality of RF transmitting antennas 146. This information is then used to compute the position and orientation of first rigid boy 154 with respect to second rigid body 172, as discussed earlier.

GNSS device 210 for determining the position and orientation of first rigid body 154 with respect to second rigid body 172 includes plurality of radio frequency (RF) receiving antennas 112 as shown in FIG. 10. Each one of plurality of RF antennas 112 is coupled to second rigid body 172. In this embodiment plurality of RF receiving antennas 112 includes first RF receiving antenna 161 and second RF receiving antenna 162, but this is not meant to be limiting. In some embodiments plurality of RF receiving antennas 112 is one RF receiving antenna. In some embodiments plurality of RF receiving antennas 112 includes more than two RF receiving antennas. Each one of plurality of RF receiving antennas 112 receives plurality of RF signals 114. Each one of plurality of RF receiving antennas 112 is coupled to a receiving antenna circuit. In this embodiment first RF receiving antenna 161 is coupled to first receiving antenna circuit 230 as shown in FIG. 10 and FIG. 11, and second RF receiving antenna 162 is coupled to second receiving antenna circuit 231 as shown in FIG. 10 and FIG. 12.

First receiving antenna circuit 230 receives plurality of RF signals 114, in this embodiment RF signals 135 and 137, as received by first RF receiving antenna 161, as shown in FIG. 11. Second receiving antenna circuit 231 receives plurality of RF signals 114, in this embodiment RF signal 135 and 137, as received by second RF receiving antenna 162, as shown in FIG. 12. RF signals 135 and 137 as received by first RF receiving antenna 161 are conducted to receiver 120 through first receiving antenna circuit 230. RF signals 135 and 137 as received by second RF receiving antenna 162 are conducted to receiver 120 through second receiving antenna circuit 231.

First and second receiving antenna circuits 230 and 231 are both coupled to second rigid body 172 (FIG. 9). In this embodiment first RF receiving antenna 161 is coupled to first receiving antenna circuit 230, and second RF receiving antenna 162 is coupled to second receiving antenna circuit 231. In some embodiments where there are more than two RF receiving antennas 112, GNSS device 210 includes more than two RF receiving antenna circuits 230 and 231, one for each corresponding RF receiving antenna.

In the embodiment shown in FIG. 9 through FIG. 16, second rigid body 172 is moveably coupled to first rigid body 154, but this is not meant to be limiting. In some embodiments second rigid body is not coupled to first rigid body 154. First rigid body 154 is controlled by second rigid body 172 using control 111 as discussed earlier with regard to FIG. 1 and FIG. 2.

GNSS device 210 for determining the position and orientation of first rigid body 154 with respect to second rigid body 172 also includes plurality of GNSS antennas 122 (see FIG. 14), which in this embodiment includes first GNSS antenna 164 and second GNSS antenna 165, as shown in FIG. 9 through FIG. 16. First GNSS antenna 164 and second GNSS antenna 165 are both coupled to second rigid body 172. In this embodiment first GNSS antenna 164 is coupled to first receiving antenna circuit 230 and second GNSS antenna 165 is coupled to second receiving antenna circuit 231.

First and second GNSS antennas 164 and 165 both receive plurality of GNSS satellite signals 128 (FIG. 10 through FIG. 12) from a plurality of GNSS satellites (not shown). Plurality of GNSS satellite signals 128 have a GNSS satellite signal frequency range. In this embodiment plurality of GNSS satellite signals 128 have a frequency of 1.575 GHZ, but this is not meant to be limiting. Plurality of GNSS satellite signals can be any frequency of GNSS satellite signals used now or in the future. In some embodiments the GNSS satellite signal frequency range does not overlap with the first frequency range, but this is not meant to be limiting. Plurality of GNSS satellite signals 128 in this embodiment includes GNSS satellite signals 166 and 167 (FIG. 11 and FIG. 12). In some embodiments plurality of GNSS satellite signals include more than two GNSS satellite signals. GNSS satellite signals 166 and 167 as received by first GNSS antenna 164 are conducted to receiver 120 through first receiving antenna circuit 230 (FIG. 11). GNSS satellite signals 166 and 167 as received by second GNSS antenna 165 are conducted to receiver 120 through second receiving antenna circuit 231 (FIG. 12).

FIG. 11 shows an example embodiment of first receiving antenna circuit 230. FIG. 12 shows an example embodiment of second receiving antenna circuit 231. Second receiving antenna circuit 231 in this embodiment is the same as first receiving antenna circuit 230 except it is electrically and mechanically connected to different RF and GNSS antennas. First receiving antenna circuit 230 in this embodiment is electrically and mechanically connected to RF receiving antenna 161 and GNSS antenna 164. Second receiving antenna circuit 231 in this embodiment is electrically and mechanically connected to RF receiving antenna 162 and GNSS antenna 165.

First receiving antenna circuit 230 (FIG. 11) includes first frequency converter circuit 145, amplifier 184, and first summing circuit 118. First receiving antenna circuit 230 can include many other components. Amplifier 184 can be many different types of amplifiers. In this embodiment amplifier 184 is an automatic gain control (AGC) amplifier. In some embodiments first receiving antenna circuit 230 does not include AGC amplifier 184.

First frequency converter circuit 145 (FIG. 11) accepts plurality of RF signals 114, including RF signals 135 and 137 in this embodiment, from RF receiving antenna 161. First frequency converter circuit 145 converts a frequency of plurality of RF signals 114, including RF signal 135 and 137 in this embodiment, as received by first RF antenna 161, from a first frequency in the first frequency range to a second frequency in a GNSS satellite signal frequency range. In this embodiment first frequency converter circuit 145 includes RF synthesizer 144 with 2.45-1.575 gigahertz (GHz) carrier, and mixer 116. In this embodiment first frequency converter circuit 145 downconverts plurality of RF signals 114 from a frequency of 2.45 GHz to a frequency of 1.575 GHz. First frequency converter circuit 145 outputs plurality of RF signals 114 as received by first RF antenna 161 to AGC amplifier 184 with a second frequency, 1.575 GHZ in this embodiment, which is in the GNSS satellite signal frequency range. Amp 184 sends plurality of RF signals 114 as received by first RF antenna 161 with the second frequency in the GNSS satellite signal frequency range to summing circuit 118.

First summing circuit 118 sums frequency-converted plurality of RF signals 114 as received by first RF antenna 161, which have the second frequency in the GNSS satellite signal frequency range, and plurality of GNSS satellite signals 128 received by the first GNSS antenna 164. Plurality of RF signals 114 as received by first RF antenna 161 and plurality of GNSS satellite signals 128 as received by first GNSS antenna 164 both have the second frequency in the GNSS satellite signal frequency range at this point, which in this embodiment is 1.575 GHz. Summing circuit 118 sums the frequency-converted plurality of RF signals 114 as received by first RF antenna 161 and plurality of GNSS satellite signals 128 received by the first GNSS antenna 164 and outputs these signals as first composite signal 156. First composite signal 156 is conducted to receiver 120 using cable 132. Cable 132, which in this embodiment is coax cable 132, sends composite signal 156 to receiver 120, and also conducts power input 124 and clock signal 126 from receiver 120 to receiving antenna circuit 230. Plurality of GNSS antennas 122 and synthesizer 144 share a sync signal and receiver clock 126 signal that is different from the transmitter sync 148 and transmitter clock 176 signals. Composite signal 156, which includes the frequency-converted plurality of RF signals 114 as received by first RF antenna 161 and plurality of GNSS satellite signals 128 received by the first GNSS antenna 164, are conducted through GNSS receiver 120 and are run through the downconverter, correlator, and multipath mitigation circuits of GNSS receiver 120.

Second receiving antenna circuit 231 (FIG. 12) in this embodiment is electrically and mechanically connected to RF antenna 162 and GNSS antenna 165. Second receiving antenna circuit 231 includes second frequency converter circuit 245, amplifier 284, and second summing circuit 218. First receiving antenna circuit 231 can include many other components. Amplifier 284 can be many different types of amplifiers. In this embodiment amplifier 284 is an automatic gain control (AGC) amplifier. In some embodiments first receiving antenna circuit 231 does not include amplifier 284.

Second frequency converter circuit 245 accepts plurality of RF signals 114, including RF signal 135 and 137 in this embodiment, from RF receiving antenna 162. Second frequency converter circuit 245 converts a frequency of plurality of RF signals 114, including RF signal 135 and 137 in this embodiment, as received by second RF antenna 162, from a first frequency in the first frequency range to a second frequency in the GNSS satellite signal frequency range, as explained above with respect to first receiving antenna circuit 230. Second frequency converter circuit 245 includes RF synthesizer 244 with 2.45-1.575 gigahertz (GHz) carrier, and mixer 216. Second frequency converter circuit 245 outputs plurality of RF signals 114 as received by second RF antenna 162 to AGC amp 284 with the second frequency in the GNSS satellite signal frequency range. Amp 284 sends plurality of RF signals 114 as received by second RF antenna 162 with the second frequency in the GNSS satellite signal frequency range to second summing circuit 218.

Second summing circuit 218 sums frequency-converted plurality of RF signals 114 as received by second RF antenna 162, which have the second frequency in the GNSS satellite signal frequency range, and plurality of GNSS satellite signals 128 received by second GNSS antenna 165. Plurality of RF signals 114 as received by second RF antenna 162 and plurality of GNSS satellite signals 128 as received by second GNSS antenna 165 both have the second frequency in the GNSS satellite signal frequency range at this point (1.575 GHZ in this embodiment). Summing circuit 218 sums frequency-converted plurality of RF signals 114 as received by second RF antenna 162 and plurality of GNSS satellite signals 128 received by second GNSS antenna 165 and outputs these signals as second composite signal 256. Second composite signal 256 is conducted to receiver 120 using cable 232. Cable 232, which in this embodiment is coax cable 232, sends composite signal 256 to receiver 120, and also conducts power input 124 and receiver clock signal 126 from receiver 120 to receiving antenna circuit 231.

GNSS device 210 for determining the position and orientation of first rigid body 154 with respect to second rigid body 172 includes receiver 120. Receiver 120 is electrically coupled to first receiving antenna circuit 230 and second receiving antenna circuit 231. Receiver 120 calculates the position and orientation of first rigid body 154 with respect to second rigid body 172 in response to receiving first composite signal 156 (FIG. 11) and second composite signal 256 (FIG. 12). First composite signal 156 includes plurality of RF signals 114 received by first RF antenna 161, and plurality of GNSS satellite signals 128 received by first GNSS antenna 164. Second composite signal 256 includes plurality of RF signals 114 received by second RF antenna 162, and plurality of GNSS satellite signals 128 received by second GNSS antenna 165. Thus receiver 120 calculates the position and orientation of first rigid body 154 with respect to second rigid body 172 in response to receiving plurality of RF signals 114 received by first RF antenna 161; plurality of GNSS satellite signals 128 received by first GNSS antenna 164; plurality of RF signals 114 received by second RF antenna 162; and plurality of GNSS satellite signals 128 received by second GNSS antenna 165.

Receiver circuit 120 can calculate the position and/or orientation of first rigid body 154 with respect to second rigid body 172 in many different ways. Receiver circuit 120 can calculate the position and orientation of first rigid body 154 with respect to second rigid body 172 as explained for device 110 above. In addition, receiver circuit 120 can use plurality of GNSS antennas 122 to provide the global GNSS system reference to the position and orientation of first and second rigid bodies 154 and 172.

FIG. 13 shows GNSS device 210 mounted to tractor 174. GNSS device 210 is used to provide GNSS reference location to the position and orientation calculations as discussed earlier with respect to FIG. 6, FIG. 7, and FIG. 8. FIG. 13 and FIG. 14 show GNSS antennas 164 and 165 that are added to tractor 174 as shown in FIG. 6 and FIG. 8 to provide the GNSS reference location to the position and orientation calculations. Receiver 120 in the embodiments shown in FIG. 9 through FIG. 16 is a dual GNSS receiver. By receiving first composite signal 156 and second composite signal 256 into dual GNSS receiver 120, dual GNSS receiver 120 can compute the attitude of second rigid body 172 as is known in the art of GNSS attitude sensing devices, and use this information to reference the position and attitude of first rigid body 154 to the GNSS position and GNSS attitude of second rigid body 172.

FIG. 14 shows a perspective view of one embodiment of the placement of six RF transmitters 147, 149, 150, 151, 152, and 153 on first rigid body 154, which in this embodiment is tractor blade 154 of tractor 174 of FIG. 13. And FIG. 14 also shows an example placement of two RF receiving antennas 161 and 162 on second rigid body 172, which in this embodiment is tractor body 172 of tractor 174 of FIG. 13. Tractor 174 is not shown in FIG. 14 for simplicity, but shown is reference line 155, which is on the left side of tractor blade 154 as shown in FIG. 13, and reference line 157, which is on the right side of blade 154. As mentioned earlier, this combination of six RF transmitters 146 and two RF receiving antenna 112 at optimized placement with respect to the geometry of first rigid body 154 and second rigid body 172 provide the ability to solve for orientation of first rigid body 154 including six orientation variables X, Y, Z, roll, pitch, and yaw, to solve for location with respect to first rigid body 172; and to solve for transmitter clock 176 offset. In this embodiment plurality of GNSS receiving antennas 122 is mounted to tractor 174 as shown in FIG. 13 and FIG. 14, to add the global GNSS location reference to the position and orientation calculation of first rigid body 154 with respect to second rigid body 172. Thus the position and orientation of first rigid body 154 with respect to second rigid body 172 can include GNSS location data, and GNSS attitude information with respect to second rigid body 172. In this way the GNSS position and attitude of first rigid body 154 can be determined, without the necessity to place a GNSS antenna or a GNSS receiver on first rigid body 154.

The operator of tractor 174 can determine the position and attitude of first rigid body 154—the tractor blade, so that the operator can move the tractor blade to a position needed to create a specific earth grade or drop dirt in a specific spot provided by a GNSS location or terrain map, for example. In another example, first rigid body 154 can be an implement towed behind tractor 174, and the tractor driver could know where to place a specific seed or spray a specific chemical according to a reference map of GNSS locations of where the seed or chemical needed to be placed. An operator exerting control 111 over first rigid body 154 can use the position and orientation date provided by GNSS device 210 to cause first rigid body 172 to complete its specified mission quickly and easily.

FIG. 15 and FIG. 16 show two more example uses of GNSS devices 210 as described above. FIG. 15 shows an embodiment in which GNSS device 210 is mounted to semi-truck and trailer 175. First rigid body 154 is the trailer portion of semi-truck 175, and second rigid body 172 is the cab portion of semi-truck 175. First rigid body 154 is moveably coupled to second rigid body 172. First rigid body 154 is towed behind second rigid body 172. It is advantageous for the driver of semi-truck 175 to be able to know the position and orientation, such as angle 113, of his trailer portion—first rigid body 154, so that he knows and can correct any misalignment, fish-tailing, or other anomalies in position of first rigid body 154.

First rigid body 154 has plurality of RF transmitters 146 mounted to it, which in this embodiment includes RF transmitters 147, 149, 151, and 152. Plurality of RF transmitters 146 transmits plurality of RF signals 114 as shown in FIG. 10 and FIG. 11. Second rigid body 172 has plurality of RF receiving antennas 112 mounted to it, which in this embodiment includes RF receiving antenna 161 and RF receiving antenna 162. RF receiving antenna 161 and RF receiving antenna 162 each receive plurality of RF signals 114. Second rigid body 172 also has plurality of GNSS antennas 122 mounted to it, which in this embodiment includes GNSS antenna 164 and GNSS antenna 165. GNSS antenna 164 and GNSS antenna 165 both receive plurality of GNSS satellite signals 128 as shown in FIG. 10 and FIG. 11. GNSS antenna 164, GNSS antenna 165, RF receiving antenna 161 and RF receiving antenna 162 are all electrically coupled to receiver 120 mounted to second rigid body 172. Receiver 120 calculates the position and the orientation of first rigid body 154 with respect to second rigid body 172 in response to receiving plurality of RF signals 114 received by each one of plurality of RF antennas 112, plus plurality of GNSS satellite signals 128 received by first GNSS antenna 164 and plurality of GNSS satellite signals 128 received by second GNSS antenna 165, as explained earlier for GNSS device 210 and device 110.

The driver of semi-truck 175 can use the position and orientation of first rigid body 154 to determine if adjustments or repairs need to be made in the condition, location, or orientation of his tractor-trailer—first rigid body 154, for example. The driver of semi-truck 175 can use GNSS device 210 to provide information as to the location and orientation of the trailer when backing up or performing other precise maneuvers. For example, GNSS device 210 can assist with backing up to a loading dock. GNSS device 210 can provide the driver with information on the location of the back edge of the trailer, making difficult and dangerous maneuvers easier and safer. In some embodiments GNSS device 210 can provide instructions to the driver of semi-truck 175 in response to GNSS device 210 calculating the position and orientation of first rigid body 154 with respect to second rigid body 172. In some embodiments the driver of semi-truck 175 is instructed to stop and make repairs to semi-truck 175 in response to GNSS device 210 calculating the position and orientation of first rigid body 154 with respect to second rigid body 172. In some embodiments the driver of semi-truck 175 is directed to adjust the position of first rigid body 154 with respect to second rigid body 172 in response to GNSS device 210 calculating the position and orientation of first rigid body 154 with respect to second rigid body 172.

FIG. 16 shows an embodiment in which GNSS device 210 is mounted to bulldozer 170. First rigid body 154 is the blade portion of bulldozer 170, and second rigid body 172 is the cab/body portion of bulldozer 170. First rigid body 154 is moveably coupled to second rigid body 172. First rigid body 154 is in front of second rigid body 172 and is used to push and move dirt, earth, garbage, etc. It is advantageous for the driver of bulldozer 170 to be able to know the position and orientation of his blade portion—first rigid body 154, so that he can know how to move first rigid body 154 to make the required movements in dirt, earth, garbage, etc.

First rigid body 154 has plurality of RF transmitters 146 mounted to it, which in this embodiment includes RF transmitters 147, 149, 151, and 152. Plurality of RF transmitters 146 transmits plurality of RF signals 114 as shown in FIG. 10 and FIG. 11. Second rigid body 172 has plurality of RF receiving antennas 112 mounted to it, which in this embodiment includes RF receiving antenna 161 and RF receiving antenna 162. RF receiving antenna 161 and RF receiving antenna 162 each receive plurality of RF signals 114. Second rigid body 172 also has plurality of GNSS antennas 122 mounted to it, which in this embodiment includes GNSS antenna 164 and GNSS antenna 165 (not seen in FIG. 16). GNSS antenna 164 and GNSS antenna 165 both receive plurality of GNSS satellite signals 128 as shown in FIG. 10 and FIG. 11. GNSS antenna 164, GNSS antenna 165, RF receiving antenna 161 and RF receiving antenna 162 are all electrically coupled to receiver 120 mounted to second rigid body 172. Receiver 120 calculates the position and the orientation of first rigid body 154 with respect to second rigid body 172 in response to receiving plurality of RF signals 114 received by each one of plurality of RF antennas 112, plus plurality of GNSS satellite signals 128 received by first GNSS antenna 161 and plurality of GNSS satellite signals 128 received by second GNSS antenna 162, as explained earlier for GNSS device 210 and device 110.

The driver/operator of bulldozer 170 uses the position and orientation of first rigid body 154 to decide what movements and adjustments need to be made to the position and orientation of first rigid body 154 in order to accomplish the task of bulldozer 170. In some embodiments GNSS device 210 can provide instructions to the driver of bulldozer 170 in response to GNSS device 210 calculating the position and orientation of first rigid body 154 with respect to second rigid body 172. In some embodiments the driver of bulldozer 170 is instructed to perform a particular operating instruction in response to GNSS device 210 calculating the position and orientation of first rigid body 154 with respect to second rigid body 172. In some embodiments the driver of bulldozer 170 is directed to adjust the position of first rigid body 154 with respect to second rigid body 172 in response to GNSS device 210 calculating the position and orientation of first rigid body 154 with respect to second rigid body 172.

In some uses of GNSS device 210 or device 110 as described above, first rigid body 154 is not mechanically coupled to second rigid body 172. For example, first rigid body 154 can be an earth drill (first rigid body 154) that is remotely controlled by an operator at a drill rig (second rigid body 172). GNSS device 210 can provide the position and orientation of the earth drill with respect to the drill rig, and the operator can provide the necessary movements and adjustments to the earth drill to guide the earth drill to the desired drill location in the earth. It can be readily seen that device 110 and GNSS device 210 can be used to control and adjust the movements of many different types of equipment, machinery, vehicles, etc., as well as to track the movements and location of different bodies. In any of the embodiments of device 110 and GNSS device 210 described herein, plurality of RF signals 114 can be encoded with information, data, and messages for transmission from first rigid body 154 to second rigid body 172, such as status, warnings, or other information collected from or by first rigid body 154.

Figure 17:
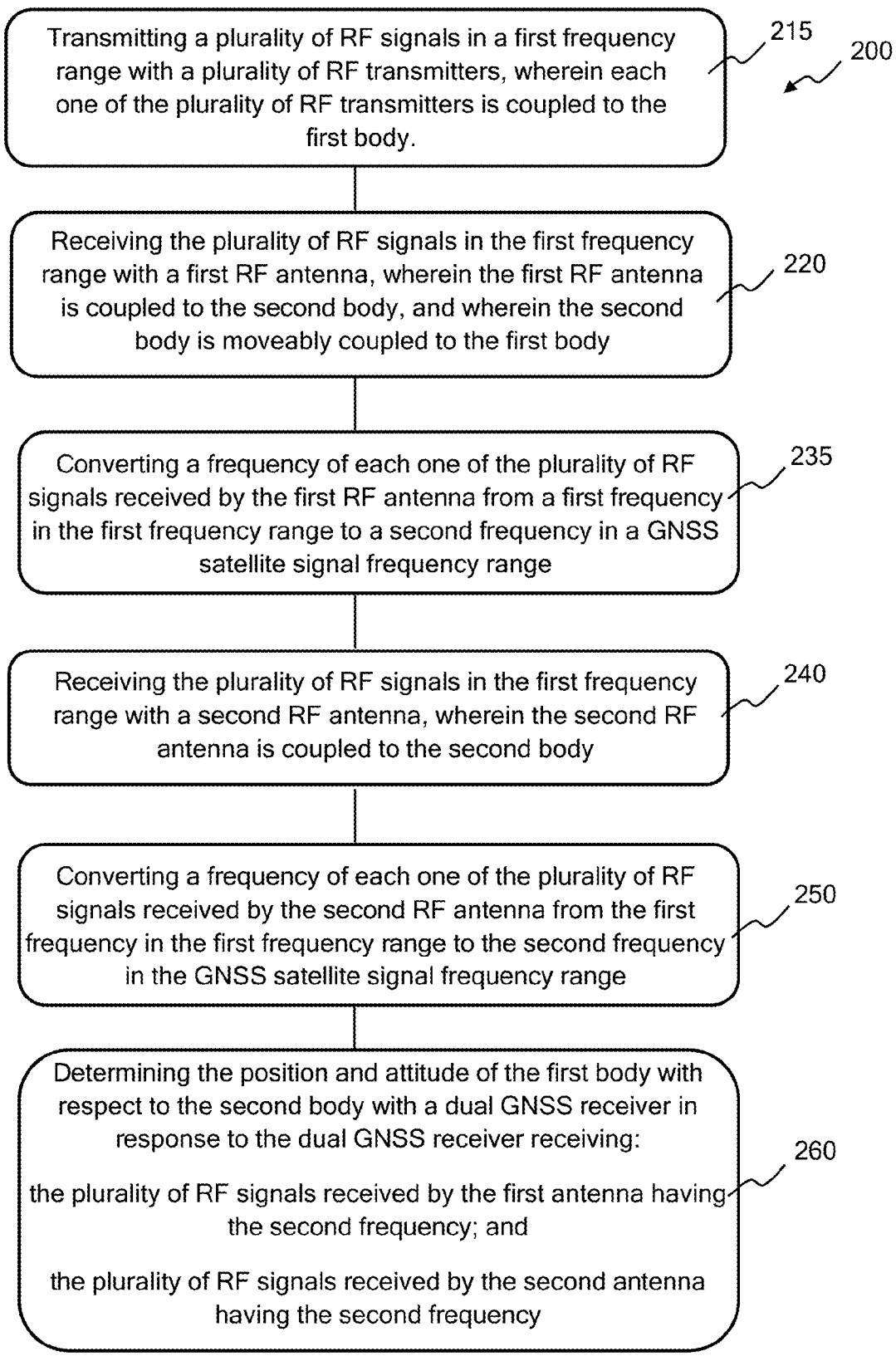
FIG. 17 illustrates method 200 of determining the position and orientation of first body 154 with respect to second body 172.

FIG. 17 illustrates method 200 of determining the position and orientation of a first body with respect to a second body. Method 200 includes element 215 of transmitting a plurality of RF signals in a first frequency range with a plurality of RF transmitters, where each one of the plurality of RF transmitters is coupled to the first body. Method 200 also includes element 220 of receiving the plurality of RF signals in the first frequency range with a first RF antenna, wherein the first RF antenna is coupled to the second body, and wherein the second body is moveably coupled to the first body. Method 200 also includes element 235 of converting a frequency of each one of the plurality of RF signals received by the first RF antenna from a first frequency in the first frequency range to a second frequency in a GNSS satellite signal frequency range, wherein the GNSS satellite signal frequency range is different from the first frequency range. In some embodiments the first frequency range and the GNSS satellite signal frequency range do not overlap, but this is not meant to be limiting. Method 200 also includes element 240 of receiving the plurality of RF signals in the first frequency range with a second RF antenna, wherein the second RF antenna is coupled to the second body. Method 200 also includes element 250 of converting a frequency of each one of the plurality of RF signals in the first frequency range received by the second RF antenna from the first frequency in the first frequency range to the second frequency in the GNSS satellite signal frequency range. And method 200 also includes element 260 of determining the position and attitude of the first body with respect to the second body with a dual GNSS receiver in response to the dual GNSS receiver receiving the plurality of RF signals received by the first antenna having the second frequency in the GNSS satellite signal frequency range, and the plurality of RF signals received by the second antenna having the second frequency in the GNSS satellite signal frequency range.

Method 200 can include many other elements. In some embodiments method 200 includes coupling a first GNSS antenna to the second body, where the first GNSS antenna receives a plurality of GNSS satellite signals having the second frequency in the GNSS satellite signal frequency range. In some embodiments method 200 includes summing the plurality of GNSS satellite signals received by the first GNSS antenna with the plurality of RF signals as received by the first antenna having the second frequency in the GNSS satellite signal frequency range. In some embodiments method 200 includes coupling a second GNSS antenna to the second body, where the second GNSS antenna receives the plurality of GNSS satellite signals having the second frequency in the GNSS satellite signal frequency range. In some embodiments method 200 includes summing the plurality of GNSS satellite signals received by the second GNSS antenna with the plurality of RF signals as received by the second antenna having the second frequency in the GNSS satellite signal frequency range.

In some embodiments of element 250, determining the position and orientation of the first body with respect to the second body with a dual GNSS receiver comprises determining the position and attitude of the first body with respect to the second body with a dual GNSS receiver in response to the dual GNSS receiver receiving the plurality of RF signals as received by the first antenna having the second frequency in the GNSS satellite signal frequency range summed with the plurality of GNSS satellite signals received by the first GNSS antenna; and the plurality of RF signals as received by the second antenna having the second frequency in the GNSS satellite signal frequency range summed with the plurality of GNSS satellite signals received by the second GNSS antenna.

In some embodiments method 200 includes providing an operating instruction to an operator of the first body in response to determining the position and orientation of the first body with respect to the second body. In some embodiments method 200 includes providing an instruction to drop a seed with the first body in response to determining the position and orientation of the first body with respect to the second body. In some embodiments method 200 includes providing an instruction to deliver fertilizer with or from the first body in response to determining the position and orientation of the first body with respect to the second body. In some embodiments method 200 includes directing an operator to adjust the position or orientation of the first body in response to determining the position and orientation of the first body with respect to the second body. In some embodiments method 200 includes directing an operator to adjust the angle of the first body in response to determining the position and orientation of the first body with respect to the second body.

As explained above, device 110 and GNSS device 210 according to the invention provide the ability to determine the position and orientation of a first body with respect to a second body and control the first body accordingly, without having to mount either GNSS antennas or a GNSS receiver to the first rigid body.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A device for determining a position and an orientation of a first rigid body with respect to a second rigid body, the device comprising:
a plurality of radio frequency (RF) transmitters, wherein the plurality of RF transmitters transmits a plurality of RF signals in a first frequency range, and wherein each one of the plurality of RF transmitters is coupled to the first rigid body;
at least one RF antenna coupled to the second rigid body, wherein the second rigid body is moveably coupled to the first rigid body, and wherein the at least one RF antenna receives the plurality of RF signals;
a first GNSS antenna coupled to the second rigid body, wherein the first GNSS antenna receives a plurality of GNSS satellite signals in a GNSS satellite signal frequency range, wherein the GNSS satellite signal frequency range does not overlap the first frequency range;
a second GNSS antenna coupled to the second rigid body, wherein the second GNSS antenna receives the plurality of GNSS satellite signals in the GNSS satellite signal frequency range;
and
a receiver circuit, wherein the receiver circuit calculates the position and the orientation of the first rigid body with respect to the second rigid body in response to the receiver circuit receiving:
the plurality of RF signals as received by the at least one RF antenna;
the plurality of GNSS satellite signals received by the first GNSS antenna;
and
the plurality of GNSS satellite signals received by the second GNSS antenna.

2. The device of claim 1, wherein the at least one RF antenna comprises:
a first RF antenna coupled to the second rigid body; and
a second RF antenna coupled to the second rigid body;
and wherein the device further comprises a first frequency converter circuit,
wherein the first frequency converter circuit converts a frequency of the plurality of RF signals received by the first RF antenna from a first frequency in the first frequency range to a second frequency in the GNSS satellite signal frequency range.

3. The device of claim 2, further comprising a second frequency converter circuit, wherein the second frequency converter circuit converts a frequency of the plurality of RF signals received by the second RF antenna from the first frequency to the second frequency.

4. The device of claim 3, further comprising a first summing circuit, wherein the first summing circuit sums the plurality of RF signals received by the first RF antenna and the plurality of GNSS satellite signals received by the first GNSS antenna.

5. The device of claim 4, further comprising a second summing circuit, wherein the second summing circuit sums the plurality of RF signals received by the second RF antenna and the plurality of GNSS satellite signals received by the second GNSS antenna.

6. The device of claim 5, wherein the at least one RF antenna further comprises:
a third RF antenna coupled to the second rigid body, wherein the third RF antenna has a height offset as compared to the first RF antenna.

7. The device of claim 1, wherein each one of the plurality of RF transmitters receives a transmitter clock signal, and wherein each one of the plurality of RF transmitters is time-synchronized to the transmitter clock signal.

8. The device of claim 1, wherein each one of the plurality of RF signals comprises a position message, wherein the position message identifies which specific one of the plurality of RF transmitters originated each specific one of the plurality of RF signals.

9. A global navigation satellite system (GNSS) device comprising:
a plurality of radio frequency transmitters, wherein the plurality of RF transmitters transmits a plurality of RF signals in a first frequency range, and wherein each one of the plurality of RF transmitters is coupled to a first rigid body;
a first receiving antenna circuit coupled to a second rigid body, wherein the first receiving antenna circuit outputs a first composite signal in a GNSS satellite signal frequency range in response to receiving:
the plurality of RF signals in the first frequency range; and
a plurality of GNSS satellite signals in the GNSS satellite signal frequency range, wherein the first frequency range does not overlap with the GNSS satellite signal frequency range;
a second receiving antenna circuit coupled to the second rigid body, wherein the second receiving antenna circuit outputs a second composite signal in the GNSS satellite signal frequency range in response to receiving:
the plurality of RF signals in the first frequency range; and
the plurality of GNSS satellite signals in the GNSS satellite signal frequency range;
and
a GNSS receiver electrically coupled to the first receiving antenna circuit and the second receiving antenna circuit, wherein the GNSS receiver calculates the orientation of the first rigid body with respect to the second rigid body in response to receiving the first composite signal and the second composite signal.

10. The device of claim 9, wherein the first receiving antenna circuit is electrically coupled to:
a first RF antenna, wherein the first RF antenna receives the plurality of RF signals in the first frequency range; and
a first GNSS antenna, wherein the first GNSS antenna receives the plurality of GNSS satellite signals in the GNSS satellite signal frequency range.

11. The device of claim 10, wherein the second receiving antenna circuit is electrically coupled to:
a second RF antenna, wherein the second RF antenna receives the plurality of RF signals in the first frequency range;
and
a second GNSS antenna, wherein the second GNSS antenna receives the plurality of GNSS satellite signals in the GNSS satellite signal frequency range.

12. The device of claim 11, wherein the first receiving antenna circuit further comprises:
a first frequency converter circuit, wherein the first frequency converter circuit converts a frequency of the plurality of RF signals received by the first RF antenna from a first frequency in the first frequency range to a second frequency in the GNSS satellite signal frequency range;
and
a first summing circuit, wherein the first summing circuit sums the frequency-converted plurality of RF signals received by the first RF antenna and the plurality of GNSS satellite signals received by the first GNSS antenna.

13. The device of claim 12, wherein the second receiving antenna circuit further comprises:
a second frequency converter circuit, wherein the second frequency converter circuit converts a frequency of the plurality of RF signals received by the second RF antenna from a first frequency in the first frequency range to a second frequency in the GNSS satellite signal frequency range;
and
a second summing circuit, wherein the second summing circuit sums the frequency-converted plurality of RF signals received by the second RF antenna and the plurality of GNSS satellite signals received by the second GNSS antenna.

14. The device of claim 9, wherein each one of the plurality of RF transmitters is electrically connected to every other one of the plurality of RF transmitters.

15. The device of claim 9, wherein each one of the plurality of RF transmitters is wirelessly electrically connected to every other one of the plurality of RF transmitters.

16. The device of claim 9, wherein the second body is moveably coupled to the first body.

17. The device of claim 9, wherein each one of the plurality of RF transmitters is time-synchronized to every other one of the plurality of RF transmitters.

18. The device of claim 9, wherein each specific one of the plurality of RF signals comprises a position message, wherein the position message identifies which specific one of the plurality of RF transmitters originated each specific one of the plurality of RF signals.

19. A method of determining the position and orientation of a first body with respect to a second body, the method comprising:
transmitting a plurality of RF signals in a first frequency range with a plurality of RF transmitters, wherein each one of the plurality of RF transmitters is coupled to the first body;
receiving the plurality of RF signals in the first frequency range with a first RF antenna, wherein the first RF antenna is coupled to the second body, and wherein the second body is moveably coupled to the first body;
converting a frequency of each one of the plurality of RF signals received by the first RF antenna from a first frequency in the first frequency range to a second frequency in a GNSS satellite signal frequency range, wherein the GNSS satellite signal frequency range is different from the first frequency range;
receiving the plurality of RF signals in the first frequency range with a second RF antenna, wherein the second RF antenna is coupled to the second body;
converting a frequency of each one of the plurality of RF signals in the first frequency range received by the second RF antenna from the first frequency in the first frequency range to the second frequency in the GNSS satellite signal frequency range;
and
determining the position and attitude of the first body with respect to the second body with a dual GNSS receiver in response to the dual GNSS receiver receiving:

the plurality of RF signals as received by the first antenna having the second frequency in the GNSS satellite signal frequency range; and the plurality of RF signals as received by the second antenna having the second frequency in the GNSS satellite signal frequency range.

20. The method of claim 19, further comprising:

coupling a first GNSS antenna to the second body, wherein the first GNSS antenna receives a plurality of GNSS satellite signals having the second frequency in the GNSS satellite signal frequency range;

and summing the plurality of GNSS satellite signals received by the first GNSS antenna with the plurality of RF signals as received by the first antenna having the second frequency in the GNSS satellite signal frequency range.

21. The method of claim 20, further comprising:

coupling a second GNSS antenna to the second body, wherein the second GNSS antenna receives the plurality of GNSS satellite signals having the second frequency in the GNSS satellite signal frequency range;

and summing the plurality of GNSS satellite signals received by the second GNSS antenna with the plurality of RF signals as received by the second antenna having the second frequency in the GNSS satellite signal frequency range.

22. The method of claim 21, wherein determining the position and orientation of the first body with respect to the second body with a dual GNSS receiver comprises determining the position and attitude of the first body with respect to the second body with a dual GNSS receiver in response to the dual GNSS receiver receiving:

the plurality of RF signals received by the first antenna having the second frequency in the GNSS satellite signal frequency range summed with the plurality of GNSS satellite signals received by the first GNSS antenna;

and the plurality of RF signals received by the second antenna having the second frequency in the GNSS satellite signal frequency range summed with the plurality of GNSS satellite signals received by the second GNSS antenna.

* * * * *